(12) United States Patent
Beg et al.

(10) Patent No.: US 8,140,898 B2
(45) Date of Patent: Mar. 20, 2012

(54) TECHNIQUES FOR GATHERING EVIDENCE FOR PERFORMING DIAGNOSTICS

(75) Inventors: Mirza Mohsin Beg, Foster City, CA (US); Charles P. Sum, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 123 days.

(21) Appl. No.: 12/485,766

(22) Filed: Jun. 16, 2009

(65) Prior Publication Data

US 2010/0318853 A1    Dec. 16, 2010

(51) Int. Cl.
*G06F 11/00* (2006.01)

(52) U.S. Cl. .................. 714/26; 714/25; 714/37

(58) Field of Classification Search .......... 714/25, 714/26, 33, 37, 39
See application file for complete search history.

(56) References Cited

U.S. PATENT DOCUMENTS

| | | | |
|---|---|---|---|
| 4,866,635 A | | 9/1989 | Kahn et al. |
| 5,067,099 A | | 11/1991 | McCown et al. |
| 5,123,017 A | | 6/1992 | Simpkins et al. |
| 5,309,448 A | | 5/1994 | Bouloutas et al. |
| 5,845,272 A | | 12/1998 | Morjaria et al. |
| 5,920,489 A | | 7/1999 | Dibrino et al. |
| 5,922,079 A | * | 7/1999 | Booth et al. .......... 714/26 |
| 5,968,122 A | | 10/1999 | Schlosser et al. |
| 6,012,152 A | * | 1/2000 | Douik et al. .......... 714/26 |
| 6,125,311 A | | 9/2000 | Lo |
| 6,182,249 B1 | | 1/2001 | Wookey et al. |
| 6,208,955 B1 | | 3/2001 | Provan et al. |
| 6,237,114 B1 | | 5/2001 | Wookey et al. |
| 6,243,628 B1 | | 6/2001 | Bliley et al. |
| 6,349,335 B1 | | 2/2002 | Jenney |
| 6,434,512 B1 | | 8/2002 | Discenzo |
| 6,519,552 B1 | | 2/2003 | Sampath et al. |
| 6,535,865 B1 | | 3/2003 | Skaaning et al. |
| 6,539,337 B1 | | 3/2003 | Provan et al. |
| 6,604,141 B1 | | 8/2003 | Ventura |
| 6,615,090 B1 | | 9/2003 | Blevins et al. |
| 6,633,782 B1 | | 10/2003 | Schleiss et al. |
| 6,665,425 B1 | | 12/2003 | Sampath et al. |
| 6,681,215 B2 | | 1/2004 | Jammu |
| 6,697,810 B2 | | 2/2004 | Kumar et al. |
| 6,697,962 B1 | | 2/2004 | McCrory et al. |

(Continued)

FOREIGN PATENT DOCUMENTS

EP    633536 A1    1/1995

OTHER PUBLICATIONS

Non-Final Office Action for U.S. Appl. No. 12/251,671 mailed on Sep. 17, 2010; 13 pages.

(Continued)

*Primary Examiner* — Robert Beausoliel, Jr.
*Assistant Examiner* — Joseph D Manoskey
(74) *Attorney, Agent, or Firm* — Kilpatrick Townsend & Stockton LLP

(57) ABSTRACT

Techniques for performing diagnostics for a monitored system. In one embodiment, an aggregate model built using a set of models is used to determine a set of probes or tests to be executed for obtaining information related to the monitored system. The obtained evidence information is then applied to the aggregate model to perform diagnostics for one or more conditions detected in the monitored system.

20 Claims, 14 Drawing Sheets

U.S. PATENT DOCUMENTS

| | | | |
|---|---|---|---|
| 6,738,811 | B1 | 5/2004 | Liang |
| 6,782,345 | B1 | 8/2004 | Siegel et al. |
| 6,862,698 | B1 | 3/2005 | Shyu |
| 6,892,317 | B1 | 5/2005 | Sampath et al. |
| 6,910,000 | B1 | 6/2005 | Yedidia et al. |
| 6,915,128 | B1 | 7/2005 | Oh |
| 6,944,800 | B2 | 9/2005 | Brundridge et al. |
| 6,983,200 | B2 | 1/2006 | Bodin et al. |
| 6,985,901 | B1 | 1/2006 | Sachse et al. |
| 7,062,749 | B2 | 6/2006 | Cyr et al. |
| 7,096,387 | B2 | 8/2006 | Durrant et al. |
| 7,113,988 | B2 | 9/2006 | Chirashnya et al. |
| 7,124,328 | B2 | 10/2006 | Bowers et al. |
| 7,165,190 | B1 | 1/2007 | Srivastava et al. |
| 7,177,769 | B2 | 2/2007 | Larsson et al. |
| 7,257,744 | B2 | 8/2007 | Sabet et al. |
| 7,281,040 | B1 | 10/2007 | Ly |
| 7,281,170 | B2 | 10/2007 | Taylor et al. |
| 7,308,385 | B2 | 12/2007 | Wegerich et al. |
| 7,313,735 | B1 | 12/2007 | Levergood et al. |
| 7,500,143 | B2 | 3/2009 | Buia et al. |
| 7,525,910 | B2 | 4/2009 | Wen |
| 7,546,222 | B2 | 6/2009 | Chintalapti et al. |
| 7,577,872 | B2 | 8/2009 | DiBartolomeo et al. |
| 7,603,674 | B2 | 10/2009 | Cyr et al. |
| 7,668,953 | B1 | 2/2010 | Sinclair et al. |
| 7,802,144 | B2 * | 9/2010 | Vinberg et al. ............ 714/25 |
| 7,937,623 | B2 | 5/2011 | Ramacher et al. |
| 7,941,707 | B2 | 5/2011 | Sarig et al. |
| 7,954,090 | B1 | 5/2011 | Qureshi et al. |
| 8,032,625 | B2 | 10/2011 | Benfield et al. |
| 2003/0033559 | A1 | 2/2003 | Williams |
| 2003/0074607 | A1 | 4/2003 | Brundridge et al. |
| 2004/0078683 | A1 | 4/2004 | Buia et al. |
| 2004/0078695 | A1 | 4/2004 | Bowers et al. |
| 2004/0078727 | A1 | 4/2004 | Little et al. |
| 2004/0153429 | A1 | 8/2004 | Horn et al. |
| 2004/0193956 | A1 | 9/2004 | Greenlee et al. |
| 2005/0102567 | A1 | 5/2005 | McGuire et al. |
| 2005/0120273 | A1 | 6/2005 | Hudson et al. |
| 2005/0160325 | A1 | 7/2005 | Ogino et al. |
| 2005/0210331 | A1 * | 9/2005 | Connelly et al. ............ 714/26 |
| 2005/0228880 | A1 | 10/2005 | Champlin |
| 2006/0150156 | A1 | 2/2006 | Cyr et al. |
| 2006/0200711 | A1 | 9/2006 | Schondelmayer et al. |
| 2006/0256727 | A1 | 11/2006 | Acharya et al. |
| 2007/0021966 | A1 | 1/2007 | Ellefson et al. |
| 2007/0283329 | A1 | 12/2007 | Caprihan et al. |
| 2007/0294003 | A1 | 12/2007 | Underdal et al. |
| 2008/0065706 | A1 | 3/2008 | Miller et al. |
| 2008/0109796 | A1 | 5/2008 | Kosche |
| 2008/0125877 | A1 | 5/2008 | Miller et al. |
| 2008/0133978 | A1 * | 6/2008 | Angamuthu et al. ........ 714/39 |
| 2008/0141072 | A1 | 6/2008 | Kalgren et al. |
| 2008/0189488 | A1 | 8/2008 | DeWitt et al. |
| 2008/0208784 | A1 | 8/2008 | Hill et al. |
| 2008/0208787 | A1 | 8/2008 | Luchene |
| 2008/0255885 | A1 | 10/2008 | Eisenberger et al. |
| 2008/0263399 | A1 | 10/2008 | Cousin et al. |
| 2008/0282095 | A1 | 11/2008 | Haider et al. |
| 2008/0297375 | A1 | 12/2008 | Khuzadi |
| 2009/0028055 | A1 | 1/2009 | Zaencker |
| 2009/0083576 | A1 | 3/2009 | Vlassova et al. |
| 2009/0105982 | A1 | 4/2009 | Sarig et al. |
| 2009/0105989 | A1 | 4/2009 | Ramacher et al. |
| 2009/0105991 | A1 | 4/2009 | Ramacher et al. |
| 2009/0106180 | A1 | 4/2009 | Kuchibhotla et al. |
| 2009/0106262 | A1 | 4/2009 | Fallen et al. |
| 2009/0106278 | A1 | 4/2009 | Ramacher et al. |
| 2009/0106363 | A1 | 4/2009 | Fallen et al. |
| 2009/0106589 | A1 | 4/2009 | Ramacher et al. |
| 2009/0106595 | A1 | 4/2009 | Sarig et al. |
| 2009/0106596 | A1 | 4/2009 | Fallen et al. |
| 2009/0106601 | A1 | 4/2009 | Ngai et al. |
| 2009/0106605 | A1 | 4/2009 | Kuchibhotla et al. |
| 2009/0327815 | A1 | 12/2009 | Sridharan et al. |
| 2010/0100778 | A1 | 4/2010 | Sullivan |
| 2010/0257410 | A1 | 10/2010 | Cottrell et al. |
| 2010/0318847 | A1 | 12/2010 | Beg et al. |
| 2010/0318855 | A1 | 12/2010 | Beg et al. |
| 2011/0153540 | A1 | 6/2011 | Beg et al. |

OTHER PUBLICATIONS

Non-Final Office Action for U.S. Appl. No. 12/251,700 mailed on Jul. 19, 2010; 16 pages.

Non-Final Office Action for U.S. Appl. No. 12/252,056 mailed on Sep. 21, 2010; 17 pages.

Alexandru, M., et al., "An architectural system solution for technical diagnosis," pp. TuD5-17-TuD5-22, International Society of Information Fusion (ISIF), Copyright 2000. [Can also be found in Information Fusion 2000, Jul. 10-13, 2000, vol. 1.].

Avin, C., et al., "Identifiability of Path-Specific Effects," UCLA Cognitive Systems Laboratory, Technical Report R-321 of Jun. 2005, in Proceedings of the 19th International Joint Conference on Artificial Intelligence, Edinburgh, Scotland, Aug. 2005, 7 pages.

Haicheng, W., et al., "Research on The Function Model of Distributed Intelligent Monitoring and Diagnosis System Based on Multi-Agent," in Electronic Measurement and Instruments, 2007, The Eighth International Conference on Electronic Measurement and Instruments, ICEMI 2007, pp. 3-393-3-396, Copyright 2007 IEEE.

Halpern, J. Y., et al., "Causes and Explanations: A Structural-Model Approach—Part I: Causes," Technical Report R-266-UAI of Jun. 2001, in Proceedings of the Seventeenth Conference on Uncertainty in Artificial Intelligence, San Francisco, CA, 2001, pp. 194-202. [Can also be found in British Journal of Philosophy of Science, vol. 56, 2005, pp. 843-887.].

Halpern, J. Y., et al., "Causes and Explanations: A Structural-Model Approach—Part II: Explanations," Technical Report R-266-IJCAI of Jun. 2001, in Proceedings of the Seventeenth International Joint Conference on Artificial Intelligence (IJCAI), San Francisco, CA, 2001, 8 pages. [Can also be found in British Journal of Philosophy of Science, vol. 56, 2005, pp. 889-911.].

Jongsawat, N., et al., "Dynamic Data Feed to Bayesian Network Model and SMILE Web Application," in Ninth ACIS International Conference on Software Engineering, Artificial Intelligence, Networking, and Parallel/Distributed Computing, pp. 931-936, Copyright 2008 IEEE.

Morjaria, M., et al., "Monitoring Complex Systems with Causal Networks," IEEE Computational Science & Engineering, vol. 3, Issue 4, Winter 1996, pp. 9-10.

Nielsen, U. H., et al., "Explanation Trees for Causal Bayesian Networks," 8 pages. [Can also be found in Proceedings of the 24th Annual Conference on Uncertainty in Artificial Intelligence (UAI-08), 2008, pp. 427-434.].

Pearl, J., "Causal Diagrams for Empirical Research (With Discussions)," Technical Report R-218-B, Biometrika, vol. 82, No. 4, 1995, pp. 669-710, printed in Great Britain.

Pearl, J., "Causal Inference in Statistics: An Overview," Technical Report R-350 of Sep. 2009, Statistics Surveys, vol. 3, 2009, pp. 96-146.

Pearl, J., "Direct and Indirect Effects," Technical Report R-273-UAI of Jun. 2001, In Proceedings of the Seventeenth Conference on Uncertainty in Artificial Intelligence, San Francisco, CA, 2001, pp. 411-420.

Pearl, J., "Robustness of Causal Claims," Technical Report R-320 of Mar. 2004, Submitted to the 20th Conference on Uncertainty in Artificial Intelligence, Banff, Canada, Jul. 2004, 8 pages. [Can also be found in Proceedings of the 20th Conference on Uncertainty in Artificial Intelligence, AUAI Press, Arlington, VA, Jul. 2004, pp. 446-453.].

Pearl, J., "Simpson's Paradox: An Anatomy," Technical Report R-264, Extracted from Chapter 6 of Causality, Apr. 1999, pp. 1-11.

Pearl, J., "Statistics and Causal Inference: A Review," Test Journal, vol. 12, No. 2, Dec. 2003, pp. 281-345.

Pearl, J., "The Logic of Counterfactuals in Causal Inference (Discussion of 'Causal Inference without Counterfactuals' by A.P. Dawid)," Technical Report R-269 of Apr. 2000, in Journal of American Statistical Association, vol. 95, No. 450, Jun. 2000, pp. 428-435.

Tian, J., et al., "A General Identification Condition for Causal Effects," Technical Report R-290-A of Aug. 2002, in Proceedings of the Eighteenth National Conference on Artificial Intelligence, AAAI Press/The MIT Press: Menlo Park, CA, Aug. 2002, pp. 567-573.

Tian, J., et al., "Probabilities of Causation: Bounds and Identification," Technical Report R-271-A of Feb. 2000, in Annals of Mathematics and Artificial Intelligence, vol. 28, 2000, pp. 287-313.

Uraikul, V., "Artificial Intelligence for Monitoring and Supervisory Control of Process Systems," Science Direct, in Engineering Applications of Artificial Intelligence, vol. 20, Issue 2, Mar. 2007, 17 pages (pages 115-131 in publication), Copyright 2006 Elsevier Ltd.

Yu, J., et al., "Intelligent Monitoring and Diagnosis of Manufacturing Processes Using an Integrated Approach of KBANN and GA," Science Direct, in Computers in Industry, vol. 59, Issue 5, May 2008, 13 pages (pp. 489-501 in publication), Copyright 2007 Elsevier B.V.

Zhang, D., et al., "Researches and Application of a Hybrid Fault Diagnosis Expert System," Proceedings of the $3^{rd}$ World Congress on Intelligent Control and Automation, Jun. 28-Jul. 2, 2000, Hefei, P.R. China, pp. 215-219, Copyright 2000 IEEE.

Non-Final Office Action for U.S. Appl. No. 12/485,759 mailed on Dec. 21, 2010; 21 pages.

Non-Final Office Action for U.S. Appl. No. 12/251,661 mailed on Nov. 10, 2010; 20 pages.

Notice of Allowance for U.S. Appl. No. 12/251,671 mailed on Jan. 5, 2011, 6 pages.

Final Office Action for U.S. Appl. No. 12/251,700 mailed on Dec. 29, 2010; 14 pages.

Non-Final Office Action for U.S. Appl. No. 12/251,711 mailed on Nov. 9, 2010; 18 pages.

Non-Final Office Action for U.S. Appl. No. 12/251,743 mailed on Dec. 14, 2010; 19 pages.

Notice of Allowance for U.S. Appl. No. 12/252,056 mailed on Jan. 6, 2011; 6 pages.

Non-Final Office Action for U.S. Appl. No. 12/252,128 mailed on Dec. 23, 2010; 19 pages.

Non-Final Office Action for U.S. Appl. No. 12/251,731 mailed on Mar. 2, 2011; 36 pages.

Non-Final Office Action for U.S. Appl. No. 12/251,667 mailed on Mar. 1, 2011; 24 pages.

Non-Final Office Action for U.S. Appl. No. 12/251,648 mailed on Mar. 1, 2011; 35 pages.

Office Communication for U.S. Appl. No. 12/251,671 mailed on Feb. 9, 2011; 4 pages.

Beg, Mirza Mohsin, et al., "Techniques for Determining Models for Performing Diagnostics", U.S. Appl. No. 12/485,759, filed Jun. 16, 2009.

Beg, Mirza Mohsin, et al., "Techniques for Building an Aggregate Model for Performing Diagnostics", U.S. Appl. No. 12/485,763, filed Jun. 16, 2009.

Beg, Mirza Mohsin, et al., "Techniques for Generating Diagnostic Results", U.S. Appl. No. 12/641,038, filed Dec. 17, 2009.

Notice of Allowance for U.S. Appl. No. 12/251,700 mailed on Sep. 30, 2011, 10 pages.

Final Office Action for U.S. Appl. No. 12/251,731 mailed on Sep. 23, 2011, 23 pages.

Notice of Allowance for U.S. Appl. No. 12/251,667 mailed on Sep. 20, 2011, 9 pages.

Non-Final Office Action for U.S. Appl. No. 12/251,648 mailed on Sep. 20, 2011, 25 pages.

Non-Final Office Action for U.S. Appl. No. 12/252,070 mailed on Aug. 25, 2011, 7 pages.

Final Office Action for U.S. Appl. No. 12/252,128 mailed on Aug. 12, 2011, 10 pages.

Notice of Allowance for U.S. Appl. No. 12/251,711 mailed on Aug. 11, 2011, 1 page.

Final Office Action for U.S. Appl. No. 12/485,759 mailed on Aug. 8, 2011, 12 pages.

Non-Final Office Action for U.S. Appl. No. 12/251,743 mailed on Jul. 19, 2011, 11 pages.

Final Office Action for U.S. Appl. No. 12/251,661 mailed on Jun. 8, 2011, 15 pages.

Non-Final Office Action for U.S. Appl. No. 12/251,685 mailed on May 31, 2011, 9 pages.

Final Office Action for U.S. Appl. No. 12/251,711 mailed on May 19, 2011, 6 pages.

Notice of Allowance for U.S. Appl. No. 12/251,700 (Dec. 29, 2011).

Office Action for U.S. Appl. No. 12/251,667 (Jan. 17, 2012).

Notice of Allowance for U.S. Appl. No. 12/251,711 (Nov. 7, 2011).

Office Action for U.S. Appl. No. 12/251,685 (Jan. 9, 2012).

Notice of Allowance for U.S. Appl. No. 12/252,128 (Dec. 12, 2011).

Notice of Allowance for U.S. Appl. No. 12/485,759 (Dec. 19, 2011).

Notice of Allowance for U.S. Appl. No. 12/251,661 (Nov. 4, 2011).

* cited by examiner

TECHNIQUES FOR GATHERING EVIDENCE FOR PERFORMING DIAGNOSTICS

CROSS-REFERENCES TO RELATED APPLICATIONS

The present application incorporates by reference for all purposes the entire contents of the following related applications filed concurrently with the present application:

(1) U.S. application Ser. No. 12/485,759, filed Jun. 16, 2009, now U.S. Publication No. 2010/0318855, published Dec. 16, 2010, entitled TECHNIQUES FOR DETERMINING MODELS FOR PERFORMING DIAGNOSTICS; and (2) U.S. application Ser. No. 12/485,763, filed Jun. 16, 2009, now U.S. Publication No. 2010/0318847, published Dec. 16, 2010, entitled TECHNIQUES FOR BUILDING AN AGGREGATE MODEL FOR PERFORMING DIAGNOSTICS.

BACKGROUND OF THE INVENTION

Embodiments of the present invention relate to diagnostics, and more specifically to techniques for using an aggregate model for gathering evidence for performing diagnostics for a monitored system.

Various conventional techniques exist in the industry today to perform problem diagnosis. These various techniques may range from expert systems at one end of the spectrum for diagnosability to tribal knowledge forums and self-service knowledge bases at the other end. Expert systems have not been successful in establishing themselves as the de facto tool for problem diagnosis. For example, the expert systems are rule-based and deterministic. It may be a challenging task to determine a set of rules to correctly identify problems in a generic environment that applies to all user systems. Further, full failure data may not be readily available for problem diagnosis, resulting more often than not in failed rule assertions. With only partially captured failure data, it is often difficult to identify an appropriate set of rules that can correctly identify the cause of a problem.

These problems are also not solved by knowledge forums and self-service knowledge bases. The ineffectiveness of expert systems for problem diagnosis gives rise to problem diagnostic solutions using knowledge bases for user self-services or to online forums for community helps. These solutions are based on expressing tribal knowledge in an unstructured form via text or discontinued discourse threads that may require users to tediously read, understand, and interpret the often-incomplete tribal knowledge into corrective actions. Finding the right textual documents that describe the problem is often difficult and time-consuming. Accordingly, problem diagnosis based on tribal knowledge that is expressed in unstructured forms via a knowledge base and discontinued discourse in online forums may result in incomplete or unclear problem signature and characterization. Further, these approaches may require certain subjective interpretation from users, resulting in incorrect problem isolation and identification that leads to false faults.

BRIEF SUMMARY OF THE INVENTION

Embodiments of the present invention provide techniques for performing diagnostics for a monitored system. In one embodiment, an aggregate model built using a set of models is used to determine a set of probes or tests to be executed for obtaining information related to the monitored system. The obtained evidence information is then applied to the aggregate model to perform diagnostics for one or more conditions detected in the monitored system.

According to an embodiment of the present invention, techniques are provided for performing diagnostics. A set of tests is determined based upon an aggregate model generated in response to a request for diagnostics. The aggregate model may comprise a plurality of models and links between the models. The models in the aggregate model may represent causal networks for one or more systems and applications. Evidence information is then obtained from executing the set of tests. The evidence information comprises information related to a monitored system such as observable information related to the monitored system. The evidence information may then be applied to the aggregate model to obtain diagnostics results.

According to an embodiment of the present invention, each model in the plurality of models identifies causal relationships between one or more faults and observations. Each model may be represented by a Bayesian network.

The aggregate model may comprise one or more models. In one embodiment, the aggregate model comprises a first model, which may be for a system or application in the monitored system. A request is generated for a first model comprising one or more tests determined based upon the first model in the aggregate model. The evidence information that is received may comprise data obtained as a result of executing the request.

In one embodiment, determining the set of tests based upon the aggregate model may comprise determining one or more tests for a first model in the plurality of models, wherein the first model may correspond to a system or an application. The one or more tests determined for the first model represent tests to be executed for obtaining information related to the system or application. The set of tests may comprise one or more tests to be executed in the monitored system.

In one embodiment, the diagnostics results comprise information identifying one or more likely root causes for a symptom or condition detected in the monitored system.

The foregoing, together with other features and embodiments will become more apparent upon referring to the following specification, claims, and accompanying drawings.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

Figure 1:
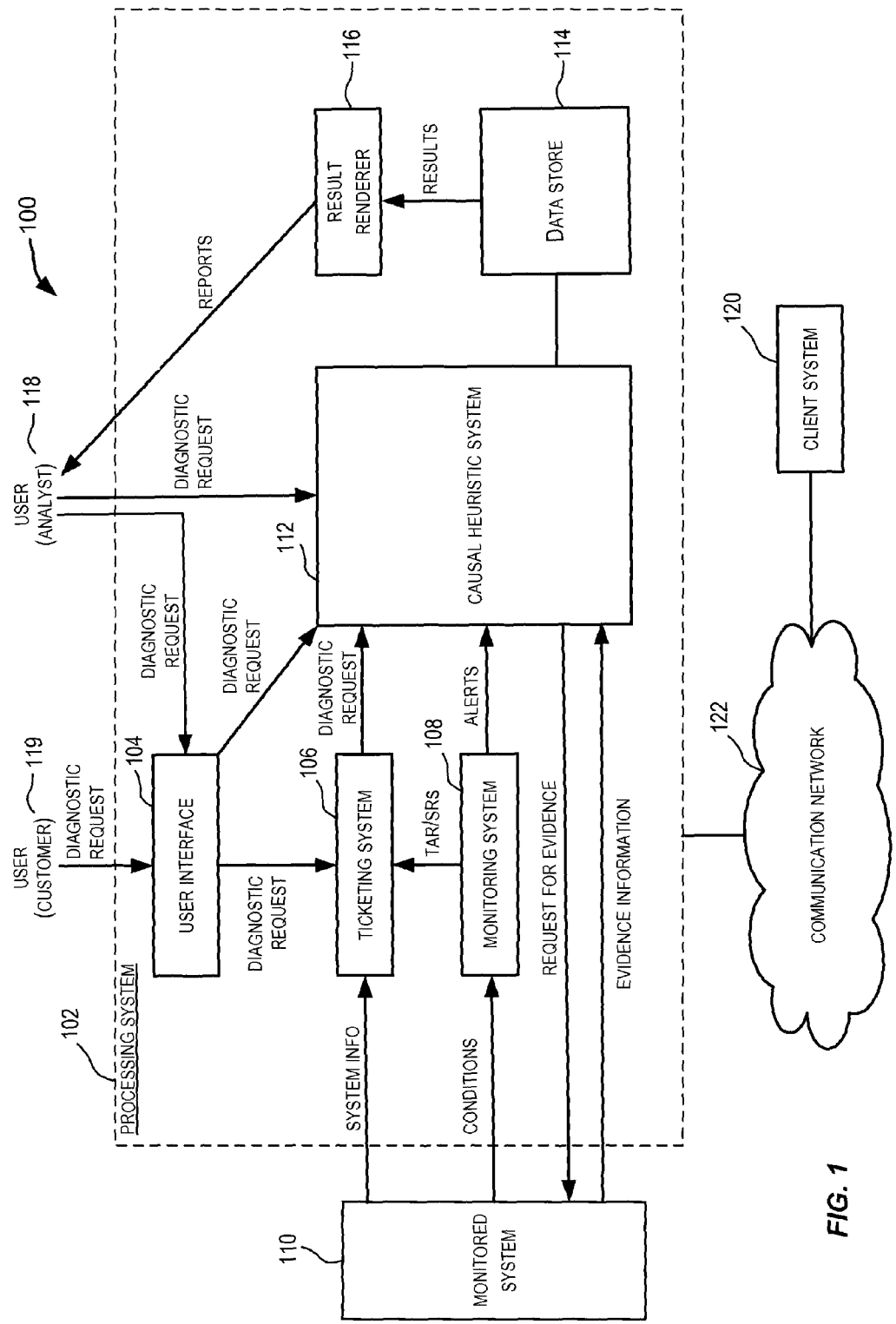
FIG. 1 is a simplified block diagram of a system incorporating an embodiment of the present invention.

FIG. 1 is a simplified block diagram of a system 100 incorporating an embodiment of the present invention. As depicted in FIG. 1, system 100 comprises a processing system 102 that is configured to provide diagnostic services for one or more systems 110 (referred to as monitored systems). A monitored system 110 may be a software system, a hardware system, an enterprise system, and the like, or combinations thereof. For example, monitored system 110 may be a complex enterprise software system such as a database system and related products provided by Oracle Corporation™ of California. Monitored system 110 may comprise one or more systems (e.g., may be an eco-system of multiple systems) with each system running one or more applications. Accordingly, reference to a monitored system may imply one or more systems included in the monitored system. While only one monitored system 110 is depicted in FIG. 1, it should be apparent that multiple monitored systems may be serviced by processing system 102. These monitored systems may represent different products or systems, or different instances or installations of the same product.

Monitored system 110 may be located remotely from processing system 102. For example, monitored system 110 may be located at a customer site and processing system 102 may be located at a vendor site. In such a scenario, communication between monitored system 110 and processing system 102 may take place over a communication network using various communication protocols. For example, the communication may occur over the Internet.

As depicted in FIG. 1, processing system 102 may comprise several components or subsystems that provide monitoring and diagnostic services for one or more monitored systems 110. These subsystems may include a user interface 104, a ticketing system 106, a monitoring system 108, a causal heuristic system 112, a data store 114, and a result renderer 116. The subsystems of processing system 102 may be implemented in software (e.g., code, instructions, program) executed by one or more processors of processing system 102, hardware, or combinations thereof. It should be apparent that the subsystems depicted in FIG. 1 are not intended to limit the scope of the present invention, as recited in the claims. In alternative embodiments, processing system 102 may have more or less subsystems than the ones depicted in FIG. 1.

In one embodiment, processing system 102 is configured to receive inputs from various sources and perform diagnostic processing responsive to the inputs. The inputs may be received from various sources including but not limited to monitored system 110, one or more users, and other systems such as client system 120. For example, processing system 102 may receive inputs in the form of system information and conditions related to the monitored system from monitored system 110. Processing system 102 may receive diagnostic requests from one or more users. A user may be a customer 119 or user of monitored system 110, an analyst 118 configured to analyze and respond to problems in monitored system 110, and others. Users may be located remotely from processing system 102. For example, a user may use client system 120 located remotely from processing system 102 to send a diagnostic request. Client system 120 may be coupled communicatively with processing system 102 via communication network 122. Client system 120 may be for example a computer, a mobile device such as a cell phone, a personal digital assistant (PDA), and the like.

Processing system 102 may provide various interfaces for inputting information to processing system 102. For example, a user interface 104 may be provided for submitting diagnostic requests. In one embodiment, user interface 104 may be a graphical user interface that enables users, such as customers or analysts, to enter diagnostic requests. User interface 104 may also provide other types of interfaces including but not limited to a command line interface (CLI), a web interface, and the like. In one embodiment, an interactive session may be provided during which a user may enter one or more diagnostic requests via user interface 104 and information generated in response to the user requests may be output to the user via user interface 104. User interface 104 is configured to receive diagnostic requests and forward the requests to the appropriate component of processing system 102 for further processing, such as to ticketing system 106 or to causal heuristic system 112. In one embodiment, user interface 104 may be a support desk application that may be used by users. Client systems 120 may also use user interface 104 to submit information and requests to processing system 102.

In some embodiments, users may also be allowed to send requests to processing system 102 without having to go through user interface 104. For example, diagnostic requests may be sent directly to components of processing system 102 such as to causal heuristic system 112.

In one embodiment, monitoring system 108 is configured to monitor the status and working condition of monitored system 110. In an embodiment where monitored system 110 comprises multiple systems executing multiple applications, monitoring system 108 may be configured to monitor the status and working conditions of one or more of the systems included in monitored system 110 and/or one or more of the applications. The monitoring may be performed in real-time. For example, monitoring system 108 may detect one or more conditions in monitored system 110. The one or more conditions detected in monitored system 110 may include errors or other problems in monitored system 110. Examples of errors may include an internal error, a system access violation, external errors (e.g., an object being accessed no longer exists), etc. The error conditions may be classified into different categories. For example, an error condition may be classified as a soft assert if it does not necessarily cause immediate harm to the monitored system. Examples of a soft assert include errors such as leaving a file open rather than closing it when the process ends—it is an error, but not immediately harmful.

In one embodiment, monitoring system 108 is configured to generate one or more alerts upon the occurrence or detection of certain conditions in monitored system 110. Monitoring system 108 may communicate the generate alerts to causal heuristic system 112 for further processing. An alert generated by monitoring system 108 may comprise various different types of information related to the detected conditions. For example, in one embodiment, an alert generated by monitoring system 108 may comprise the following information:

- Information identifying a symptom type, e.g., CPU utilization at 80%, memory usage at 90%, no response, etc. The symptom type may be based upon conditions detected by monitoring system 108 in monitored system 110.
- Information identifying an instance of an application that gives rise to the alert, e.g., a particular instance of a database application;
- Information identifying an instance of a system in which the application that gives rise to the alert is executed, e.g., a database or other system executing the one or more applications that caused generation of the alert; and
- Other information associated with the alert.

In one embodiment, upon occurrence or detection of a condition in monitored system 110, monitoring system 108 may communicate the information identifying the detected condition to ticketing system 106. The information provided to ticketing system 106 may comprise various different types of information associated with the detected condition, such as a symptom type of the detected condition, a timestamp indicating a time of occurrence of the detected condition, an error number and one or more error arguments associated with the detected condition, and other information associated with the detected condition. In one embodiment, the information identifying a condition detected in monitored system 110 may be communicated to ticketing system 106 using different types of data formats, including technical assistance requests (TAR) format and others.

Ticketing system 106 is configured to receive inputs from various sources and based upon the inputs generate diagnostic requests that are communicated to causal heuristic system 112 for further processing. For example, upon receiving information identifying a condition detected in monitored system 110 from monitoring system 108, ticketing system 106 may automatically generate a diagnostic request for the detected condition based upon the information received. A diagnostic request generated by ticketing system 106 may comprise various different types of information. For example, a diagnostic request that is generated for a condition detected in monitored system 110 may comprise information identifying a symptom type of the detected condition (e.g., CPU utilization at 80%, memory usage at 90%, no response, etc.), information identifying an instance of an application that gave rise to the detected condition (e.g., a particular instance of a database application, etc.), information identifying an instance of a system in which the application that gave rise to the condition is executed (e.g., a database system may comprise one or more database applications, etc.), component version numbers, in some cases a full diagnostic dataset as required by processing system 102, and other information that is associated with the detected condition.

Ticketing system 106 may also receive a diagnostic request provided by a user (e.g., customer 119 or analyst 118) via user interface 104. The diagnostic request may request diagnostics to be performed for a particular application or system or for a particular condition or error in monitored system 110. For example, a user may specifically request problem diagnosis for a database application that is executed in a particular system at a particular instance of time. Likewise, an analyst 118 may request problem diagnosis for a particular application executed in a computer system. The diagnostic request information that is received from a user may comprise information identifying a symptom type of a particular condition that the user is interested in diagnosing (e.g., CPU utilization at 80%, memory usage at 90%, no response, etc.), information identifying an instance of an application that gave rise to a specific condition (e.g., a particular instance of a database application, etc.), information identifying an instance of a system in which the application that gave rise to the condition is executed, and other information. Ticketing system 106 is configured to forward the diagnostic requests received from users to causal heuristic system 112.

Ticketing system 106 may also receive system information from monitored system 110 and generate diagnostic requests based upon the received information. The diagnostic requests may be forwarded to causal heuristic system 112.

Causal heuristic system 112 is configured to receive inputs, including alerts and diagnostic requests, from multiple sources including monitoring system 108, ticketing system 106, from user interface 104, directly from one or more users, and the like. In response to the inputs, causal heuristic system 112 is configured to perform diagnostic processing based upon the inputs. In one embodiment, given a diagnostic alert or request, causal heuristic system 112 is configured to determine relationships between applications and/or system for the alert or request, perform diagnosis of the errors or problems, determine potential causes of the problems or errors, and identify repeat frequencies of the problems or errors (possibly over a user-specifiable time period). The results of the diagnosis may be provided to the requesting entity such as to customer 119 or analyst 118. Causal heuristic system 112 may also initiate or recommend one or more corrective or preventive measures to mitigate or resolve the identified problems.

Causal heuristic system 112 may work in an automated lights-out mode as well as in an interactive mode. In the lights-out mode, causal heuristic system 112 may receive alerts and requests from one or more components of system 100 such as from ticketing system 106 or from monitoring system 108 and perform diagnostic activities in response to the received inputs. The diagnostic activities may be performed across multiple systems or applications in a monitored system or across multiple monitored systems. This may be done automatically without the user of monitored system 110 being aware of the problems or diagnostics. In the lights-out mode, a customer may not even know that monitored system 110 had a problem since the problem has been automatically detected and either resolved automatically by processing system 102, or manually by an administrator of monitored system 110 possibly upon receiving suggestions or recommendations from processing systems 102.

In the interactive mode, causal heuristic system 112 may receive interactive requests from one or more users, including customers 119 or analysts 118, and perform interactive diagnostic processing in response to the requests.

The data used by causal heuristic system 112 for diagnostic processing and/or the data generated by the diagnostic processing performed by causal heuristic system 112 may be stored in data store 114. Result renderer 116 is configured to extract results of the diagnostic processing from data store 114 and provide the results to a user. Results renderer 116 may be configured to generate one or more reports based upon the extracted results and present the results to the user. In one embodiment, a result renderer 116 may be used to format the results into a representation that is then output to analyst 118. For example, result objects resulting from the diagnosis may be parsed to create XML (e.g., XML report) comprising the result data. The XML format facilitates transfer of the results between applications. The result XML may be transformed by renderer 116 using a simple XSLT or some other transformation into a form to be displayed to the analyst. There are different ways in which diagnostic results may be presented to a user.

The results provided to a user may identify one or more root causes of problems for which diagnostic processing is performed by causal heuristic system 112. The results data may also include the impact scope of the problem and also the likelihood of other related problems impacting the user. The results may also include the relevant data used by causal heuristic system 112 for performing the diagnostics to enable the user to gain further insight into the problem, if needed. The results may also identify or recommend one or more preventive or curative measures to mitigate or resolve the impact of the problems. The user may then take one or more actions based upon the recommendations. For example, an analyst 118 may install appropriate patches that solve a particular failure detected in monitored system 110 based upon processing performed by causal heuristic system 112. In another embodiment, analyst 118 may inform the client to take appropriate corrective/preventive measures.

Figure 2:
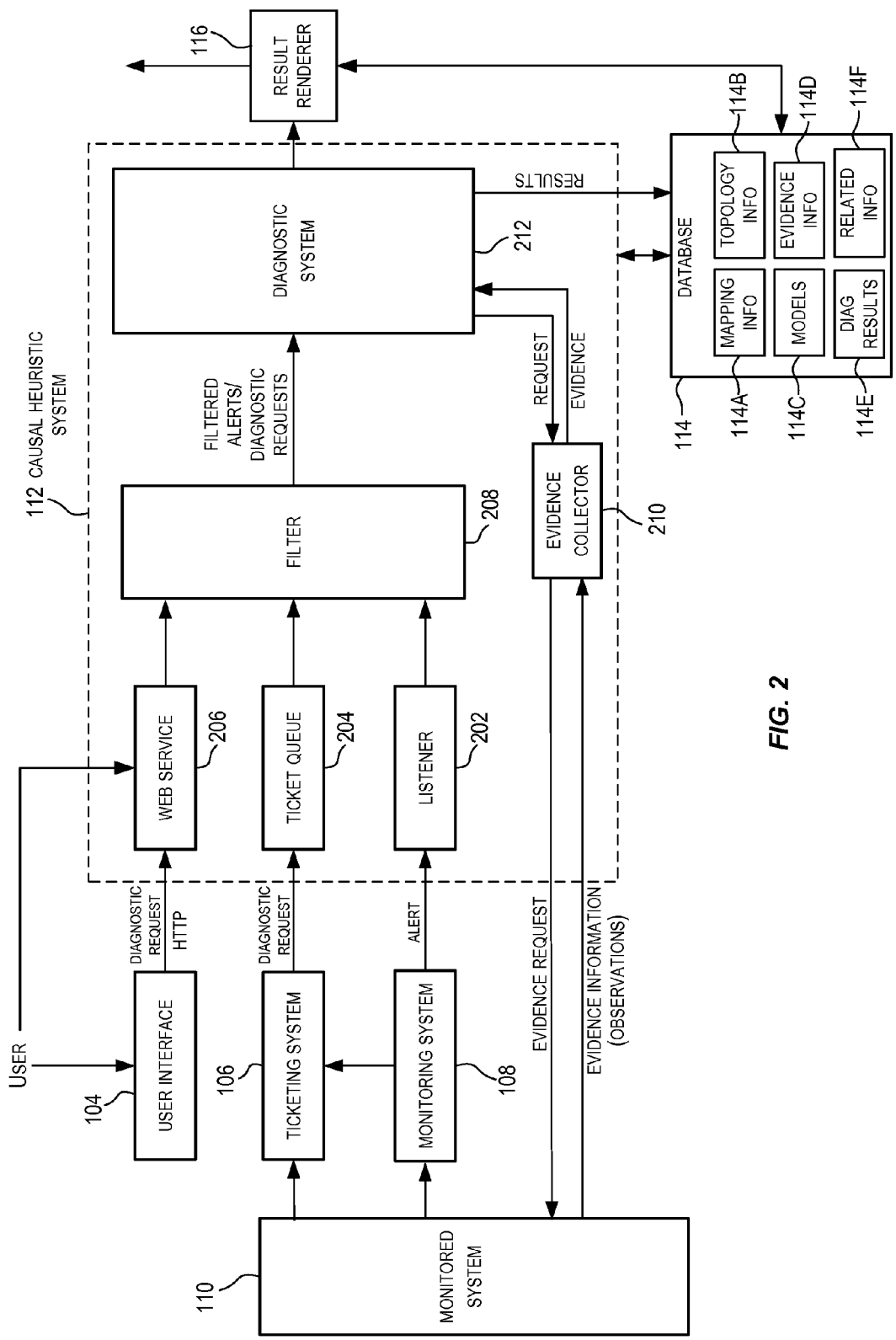
FIG. 2 is a simplified block diagram of components of a causal heuristic system according to an embodiment of the present invention.

FIG. 2 is a simplified block diagram of components of causal heuristic system 112 according to an embodiment of the present invention. In the embodiment depicted in FIG. 2, causal heuristic system 112 comprises several subsystems including a listener 202, a ticket queue 204, a Web service 206, a filter 208, an evidence collector 210, and a diagnostic system 212. The subsystems of causal heuristic system 112 depicted in FIG. 2 may be implemented in software (e.g., code, instructions, program) executed by a processor of processing system 102, hardware, or combinations thereof. The software may be stored on a computer-readable storage medium. It should be apparent that the subsystems depicted in FIG. 2 are not intended to limit the scope of the present invention, as recited in the claims. In alternative embodiments, causal heuristic system 112 may have more or less subsystems than the ones depicted in FIG. 2.

Listener 202 is configured to listen for incoming alerts including alerts received from monitoring system 108. For example, monitoring system 108 may be configured to monitor the status of monitored system 110 and send an alert to causal heuristic system 112 upon detection of particular condition(s) in monitored system 110. Listener 202 may be configured to receive these alerts from monitoring system 108 and forward the alerts to filter 208 for further processing.

An alert received by causal heuristic system 112 may comprise various different types of information related to the one or more conditions that caused the alert to be generated. For example, in one embodiment, an alert received by causal heuristic system 112 may include information identifying one or more symptoms that caused the alert, information identifying one or more instances of one or more applications experiencing the symptoms that gave rise to the alert, information identifying one or more instances of one or more systems of monitored system 110 in which the conditions or symptoms that caused the alert were detected, and the like. In one embodiment, the symptoms information may be specified in the form of a symptom type. Likewise, the applications information may be specified in the form of one or more application types (e.g., Oracle™ database application, WORD application, EXCEL spreadsheet application, user interface application, etc.). The systems of monitored system 110 identified in an alert may correspond to systems executing one or more applications in which the symptoms or conditions that caused the alert to be generated are detected.

An example of an alert received at causal heuristic system 112 may comprise information as follows:

"CPU utilization at 80% for database application A1 in computer system S1"

The above alert states that CPU utilization at 80% (symptom type) has been detected for database application A1 (application type) executed in computer system SI (system information).

In one embodiment, ticket queue 204 is configured to provide a queue repository for storing diagnostic requests, including diagnostic requests received from ticketing system 106. Different types of data structures may be used to implement queue 204. Ticket queue 204 may represent one or more queues of different types such as FIFO queues, priority queues, etc. A diagnostic request received at ticket queue 204 may comprise various different types of information. In one embodiment, a diagnostic request received at ticket queue 204 includes information similar to the information contained in an alert or a subset thereof, as previously described. Ticket queue 204 may be configured to forward the received diagnostic requests to filter 208 in an order that is designated by the particular queue (e.g., a FIFO queue).

Web service component 206 provides an interface for directly sending diagnostic requests to causal heuristic system 112. The diagnostic requests may be received from one or more users such as customers 119 or analysts 118. The diagnostic requests may also be received from client systems 120. A diagnostic request received by Web service 206 may comprise various different types of information. In one embodiment, the diagnostic request includes information similar to the information contained in an alert or a subset thereof, as previously described. The diagnostic requests may be received in various formats including HTTP format, XML format, and others. Web service 206 is configured to forward the diagnostic requests to filter 208 for further processing.

As described above, filter 208 receives diagnostic requests and alerts received by causal heuristic system 112. In one embodiment, filter 208 is configured to apply a filter to the requests and/or alerts such that only those requests or alerts that meet some predefined criteria are selected and forwarded to diagnostic system 212 for further processing. Alerts or requests that do not satisfy the filter criteria are filtered out and dropped.

The filter criteria used by filter 208 is user-configurable. Various different filter criteria may be specified. In one embodiment, only those diagnostic requests and alerts for which one or more diagnosis models exists are selected by filter 208 and forwarded to diagnostic system 212. In such an embodiment, filter 208 is configured to, based upon the information included in the diagnostic request or alert, determine if one or more diagnostic models exist for performing diagnostics for the request or alert. If such one or more diagnostic models exist, then the diagnostic request or alert is deemed to have met the filter criteria and is selected and forwarded to diagnostic system 212 for further processing. If no diagnostic model is deemed to exist for the diagnostic request or alert, then the diagnostic request or alert is deemed to have not met the filter criteria, is deemed a false alert or exception request, and is dropped (i.e., not forwarded to diagnostic system 212 for further processing).

As indicated above, the information included in a diagnostic request or alert is used to determine whether the diagnostic request or alert is dropped or forwarded to diagnostic system 212 for further processing. Various different pieces of information (e.g., symptom type, application, system, etc.) contained in the diagnostic request or alert may be used to determine whether or not a diagnostic model exists for processing the diagnostic request or alert. In one embodiment, the symptom type and application type information included in a diagnostic request or alert is used to determine if one or more diagnostic models exist for processing the diagnostic request or alert. In such an embodiment, a mapping table may be provided identifying symptom types, application types, and diagnostic models that exist for combinations of symptom types and application types. This table may then be used by filter 208 to determine if one or more models exist for processing a diagnostic request or alert. Such a table may be configured during design time and stored in data store 114 as model mapping information 114A. Mapping information 114A may then be used during runtime by filter 208.

Table 1 below shows an example of mapping information that may be configured for an embodiment of the present invention.

TABLE 1

| Symptom Type | Application Type | Diagnostic Model |
|---|---|---|
| CPU utilization at 80% | A1 | M1 |
| Memory usage at 90% | A2 | M2 |
| No Response | A2 | M3 |
| No Response | A3 | M4 |

As shown above, each row of Table 1 identifies a symptom type, an application type, and a diagnostic model to be used given a particular symptom type and application type identified in the row. For example, for an alert or diagnostic request that has Symptom Type="CPU utilization at 80%" and Application Type="A1", a diagnostic model "M1" is to be used for performing diagnostics for the alert or request. For an alert or diagnostic request that has Symptom Type="Memory usage at 90%" and Application Type="A2", a diagnostic model "M2" is to be used for performing diagnostics for the alert or request. Likewise, for an alert or diagnostic request that has Symptom Type="No Response" and Application Type="A2", diagnostic model "M3" is to be used for performing diagnostics for the alert or request. It should be noted that Table 1 does not comprise any row having a Symptom Type for Application Type="A5". Accordingly, if an incoming diagnostic request or alert a symptom for Application Type="A5", then it will be determined based upon Table 1 that no diagnostic model exists for such a diagnostic request or alert and the diagnostic request or alert will consequently be dropped by filter 208 and no diagnostics will be performed for the diagnostic request or alert.

Diagnostic system 212 is configured to receive inputs in the form of alerts and/or diagnostic requests from filter 208 and perform diagnostic processing for the alerts or requests. In one embodiment, based upon the received diagnostic request or alert, diagnostic system 212 is configured to determine an application and system and set of related applications and systems. The related applications or systems may be determined based upon related information 114F preconfigured for the monitored system and stored in data store 114. A topological relationship is then generated based upon the application and system identified in the alert or diagnostic request and based upon the related applications and systems. The topological relationship may be stored in data store 114 as topological information 114B. A set of models to be used for diagnostics may then be determined from the topological relationship. The models may be selected from models information 114C stored in data store 114 and may correspond to the models of applications and systems included in the topological relationship. In one embodiment, mapping information 114A may be used to determine models corresponding to the systems and applications included in the topological relationship. An aggregate model may then be created using the determined set of models and based upon the topological relationship. A set of probes may then be identified and run to gather evidence information for the alert or request using the aggregated model. The evidence information 114D may also be stored in data store 114. Diagnostic processing may then be performed by applying the collected evidence to the aggregate model. The results 114E of the diagnostic processing may be stored in data store 114. Services of results renderer 116 may be used to present the resultant diagnostic information to a user. Reports may also be generated based upon the resultant diagnostic information.

Figure 3:
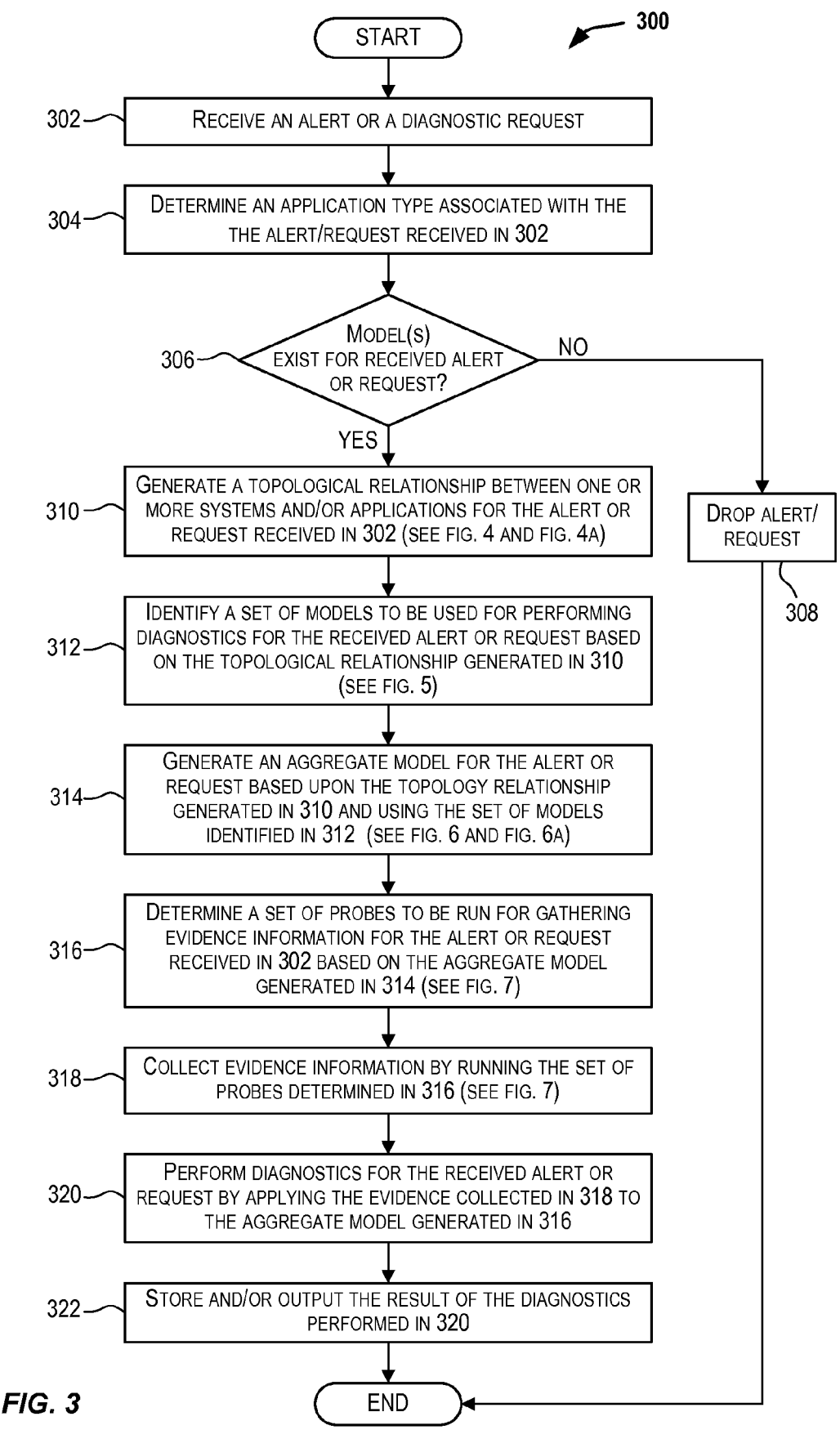
FIG. 3 is a simplified flowchart depicting a method for performing diagnostics according to an embodiment of the present invention.

FIG. 3 is a simplified flowchart 300 depicting a method for performing diagnostics according to an embodiment of the present invention. The method depicted in FIG. 3 may be performed by software (e.g., code, program, instructions) executed by a processor, in hardware, or combinations thereof. The software may be stored on a computer-readable storage medium. In one embodiment, the processing is performed by causal heuristic system 112 depicted in FIGS. 1 and 2. The method depicted in FIG. 3 is not intended to limit the scope of the application as recited in the claims.

As depicted in FIG. 3, processing is initiated upon receiving an alert or a diagnostic request (step 302). The information received in 302 may include information identifying one or more symptoms or symptom types, information identifying one or more instances of one or more application types experiencing the symptoms that gave rise to the alert, information identifying one or more instances of one or more systems of monitored system 110 in which the conditions or symptoms that caused the alert were detected, and the like.

In some embodiments, instead of identifying an application type, the information received in 302 may identify one or more instances of applications. In such embodiments, based upon the applications information received at 302, an application type associated with the alert or the diagnostic request received in 302 may be determined (step 304). For example, given an instance of an application that gives rise to the alert or diagnostic request, an application type corresponding to the instance of the application that triggers the alert may be determined based upon some predefined configuration information. The predefined configuration information may be stored in data store 114.

Processing is then performed to determine if the alert or request received in 302 satisfies the filter criteria and is selected for further processing. As part of this processing, based upon the information received in 302, a determination is made if one or more models exist for performing diagnostic processing for the received alert or the diagnostic request (step 306). As previously described, in one embodiment, the filtering may be based on the symptom type information received in 302 and the application type information received in 302 or determined in 304. For example, a mapping table such as Table 1 described above may be used for determining if there is a corresponding diagnostic model for the alert or the diagnostic request received in 302.

If it is determined in 306 that there is no corresponding diagnostic model for the alert or the diagnostic request received in 302, then the alert or the diagnosis request is discarded and processing ends (step 308). In this case, no diagnosis is performed for the alert or the diagnostic request.

If it is determined in 306 that one or more diagnostic models exist for performing diagnostic processing for the alert or request, then processing continues with step 310. A topological relationship between systems and applications is then generated for the alert or diagnostic request received in 302 (step 310). In one embodiment, as part of the processing performed in 310, one or more systems and applications are determined based upon the information received in 302 or determined in 304. A topological relationship is then determined for the identified applications and systems. Further details related to how the applications and systems are identified and how the topological relationship is created are discussed below with reference to FIG. 4A and FIG. 4B.

A set of models are then identified for the systems and applications included in the topological relationship generated in 310 (step 312). The set of models identified in 312 represent the models to be used for performing diagnostics for the alert or diagnostic request received in 302. In one embodiment, one or more mapping tables may be used to map an application or a system in the topological relationship generated in 310 to a corresponding diagnostic model.

In one embodiment, each model identified in 312 is a causal network represented by a Bayesian network. A Bayesian network is commonly used to represent joint probability distribution between a set of variables. According to an embodiment of the present invention, each Bayesian network models the causal structure of a domain. The domain may be an application or a system, etc. Such Bayesian network models may be referred to as causal Bayesian networks since they represent causation between a set of variables. A causal Bayesian network is typically a directed acyclic graph (DAG) of nodes and arcs (or links) between one or more of the nodes. The nodes represent the variables and arcs or links between the nodes denote direct probabilistic dependencies between variables denoted by the nodes. Absence of an arc or link between nodes denotes conditional independence between the variables represented by the nodes. A conditional probability distribution is associated with each node in the network, such that the probability distribution associated with a node is the probability of the state represented by the node given the states represented by the parent nodes of the node. Each node is described by a probability distribution conditional on its direct predecessors. A causal Bayesian network provides insight into interactions among the variables represented by the nodes and arcs of the network.

In one embodiment, causal network models are specified for application and system components of monitored system 110. Each causal network is modeled using a Bayesian network and models the application or system's parts, especially parts that can fail and can be fixed at the monitored system's site. For example, independent causal network models are specified for sub-systems and components of monitored system 110. Each causal network models an explanation of the system or application's failures and what part causes the failure, and so on. In one embodiment, the nodes of a model represent either faults or observations and the relationships define the degree of influence among the nodes. Faults are the underlying causes that the model tries to infer based on the state of linked observations. Conditional probability dictates the influence on such relationships. Directionality of a relationship in a model indicates the causal flow, i.e., cause to effect propagation.

In one embodiment, each causal network model comprises a plurality of nodes including one node that is designated as an input node and one or more nodes designated as output nodes. As explained below in further detail, an input node of a model represents a node to which an output node of another model can connect to during assembly of an aggregated model. Each output node of a model represents a summarization of the combination of the node's direct predecessor nodes in the model. In this manner, each output node summarizes the combined effect of one or more faults represented by its predecessors. The overall accuracy of the unique fault combination represented by the output node can be measured and improved via the output node. The summary represented by an output node represents the unique behavioral pattern in the network model.

In one embodiment, a selected node from the output nodes of a model is designated as a summary node. A summary node is a leaf node in the DAG and has no outgoing relationships defined for it. A summary node can be an observable or non-observable fault node. When it is an observable fault node, it represents an end-user visible symptom. When modeled as a non-observable fault node, it represents the component's overall health from a particular viewpoint. A network model can have one or more summary nodes, with only one marked as a primary summary node. This primary summary node is used to connect the model to input nodes of other models during aggregate model assembly.

Figure 9A:
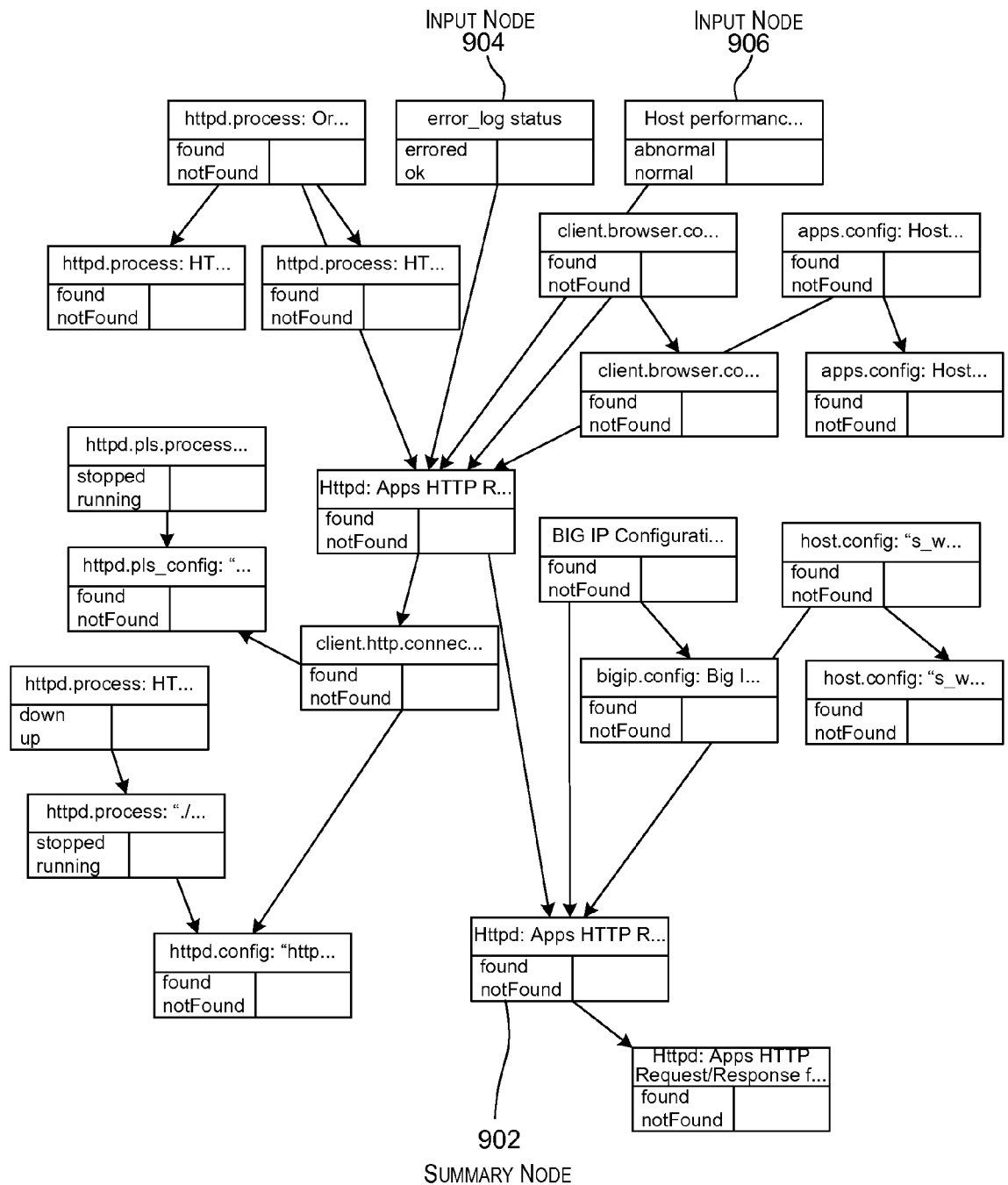
FIG. 9A depicts a simplified causal network for an application according to an embodiment of the present invention.

An example of a causal network model for an application is depicted in FIG. 9A. FIG. 9A depicts a web server application model that has one output summary node 902 and two input nodes 904 and 906. Output summary node 902 represents the summarization of the user-visible behavior of the application and in the example depicted in FIG. 9A the response of the web server if based on the combined effect of its internal processes and configuration settings. Input nodes 904 and 906 are the nodes where the outgoing nodes of other relevant models are connected.

Figure 9B:
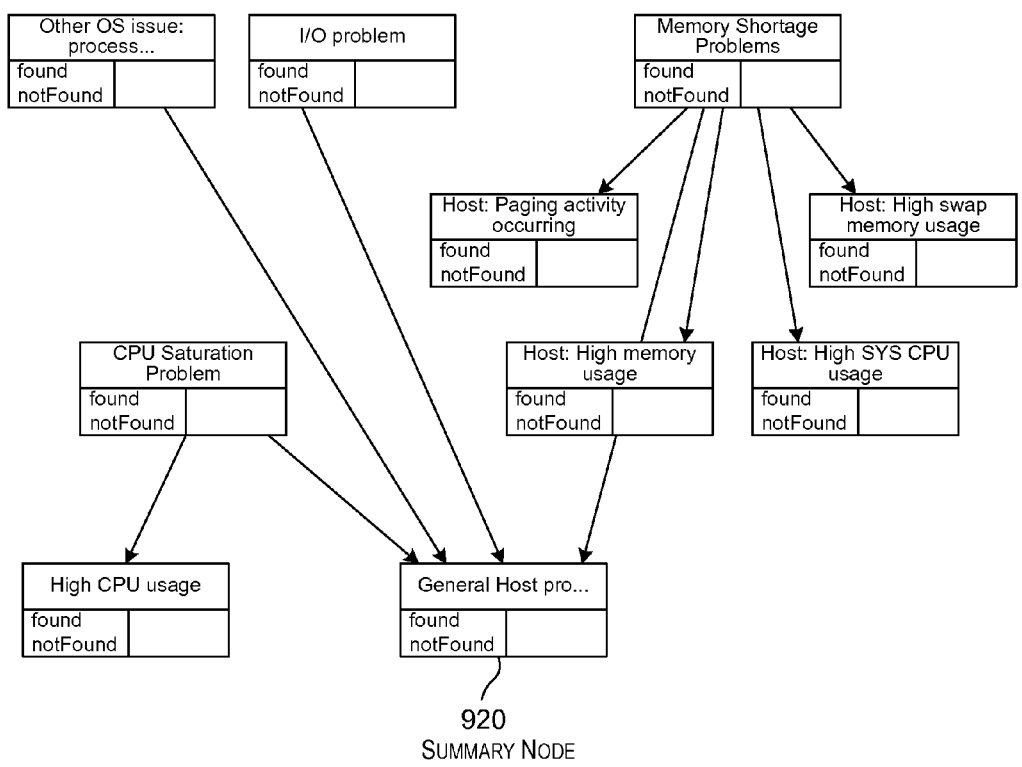
FIG. 9B depicts a simplified causal network for a system according to an embodiment of the present invention.

An example of a causal network model for a system is depicted in FIG. 9B. FIG. 9B depicts a computer system model with one output summary node 920 but no input node. Output node 920 represents the overall performance state of a overall system based on the combined effects of independent system behaviors, like number of processes, CPU, memory etc.

Referring back to FIG. 3, an aggregate model is then assembled or generated based on the topology relationship generated in 310 and using the set of models identified in 312 (step 314). In this manner, an aggregate causal Bayesian model is generated using the individual models determined in 312. The aggregate model comprises the models determined in 312. The models corresponding to the applications and systems are connected to one another according to the hierarchical relationships between the applications and systems in the topological relationship generated in 310. Two models are connected by connecting the summary node of the parent model to the input node of the child model. In this manner, a single aggregate model is assembled using the individual independent models. Further details regarding assembly of the aggregate model are discussed below with reference to FIG. 6A.

The aggregate model generated in 314 is then used to determine a set of probes to be run for collecting evidence information (step 316). In one embodiment, the set of probes determined in 316 correspond to a set of tests to be run on monitored system 110 to collect evidence to be used for the diagnostic processing to be performed for the alert or request received in 302.

The set of probes determined in 316 are executed or run on monitored system 110 to collect evidence information (step 318). The probes may be run automatically or manually. In one embodiment, one or more requests are generated, each request comprising one or more probes to be run. The requests are then sent to monitored system 110 to be executed. The evidence information collected as a result of running the probes is then forwarded to causal heuristic system 112. The evidence information comprises information identifying the observed state of monitored system 110. The observable information about monitored system 110 that is included in the evidence information may include configuration information of monitored system 110, results of executing scripts in monitored system 110, information from log files for monitored system 110, and the like.

Diagnostic processing is then performed by applying the evidence information collected in 318 to the aggregate model generated in 316 (step 320). In one embodiment, the processing performed in 320 involves drawing inferences from the evidence information or observations collected in 318. The inferences are drawn from applying the evidence information to the aggregate model generated in 316. Since the aggregate model is a causal Bayesian network, in one embodiment, the diagnostic inference identifies most likely root causes of the observations. Accordingly, given a set of observations and symptoms, the diagnostic system is able to infer possible root causes for the symptoms. In this manner, the most likely root cause for the alert or diagnostic request received in 302 may be discovered automatically and resolved in a timely manner.

In one embodiment, a software engine such as GeNIe is used for applying the evidence information collected in 318 to the aggregate causal Bayesian network constructed in 314. GeNIe is a software tool that facilitates analysis of Bayesian networks. GeNIe may also be used to construct Bayesian networks. For example, the individual models for the applications and systems may be constructed using GeNIe. Other engines or techniques may be used in alternative embodiments.

Results from performing the diagnostics in 320 may be stored and/or output (step 322). For example, the results may be stored in data store 114. The results may also be output to a user or provided to some other processing component for further processing. The results may include information identifying root causes for one or more conditions or symptoms identified in the alert or request received in 302. If the alert received in 302 was generated as a result of a condition detected in a particular system in monitored system 110, the root cause may exist in the same particular system or in some other system(s) in monitored system 110. Accordingly, root causes may be identified in other systems interconnected to the particular system that caused the generation of the alert or request. The results may also identify or recommend one or more actions to be taken in response to the received alert or request. These actions may be to mitigate or resolve the conditions or symptoms associated with the received alert or request. In one embodiment, a result renderer 116 is used to output results in a particular format, such as in XML format (e.g., XML report), HTTP format, and the like. Result renderer 116 may also be used to generate one or more reports based upon the diagnostic results. These reports may be pushed to or pulled by one or more users.

Figure 4A:
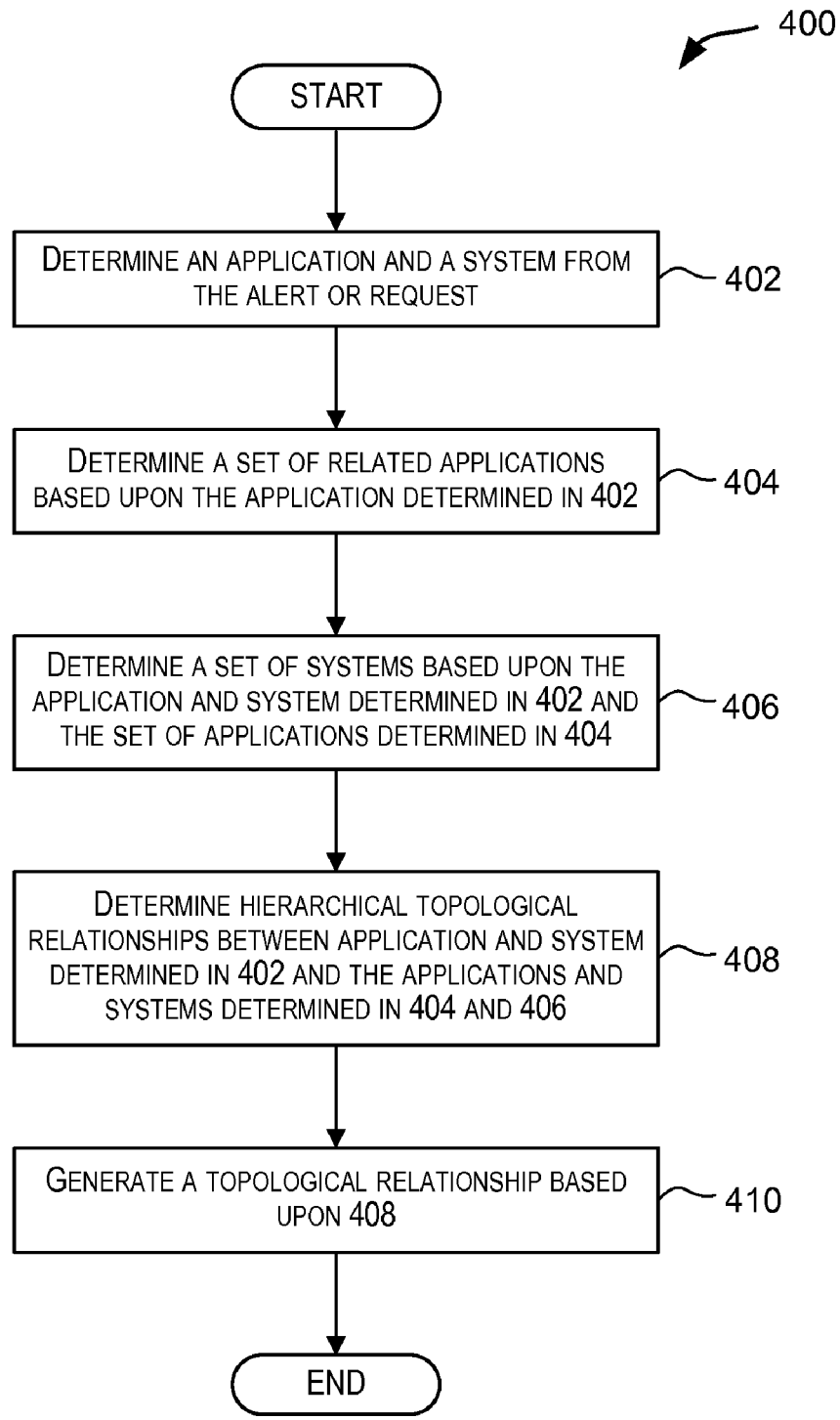
FIG. 4A is a simplified flowchart depicting a method for generating a topological relationship between applications and systems according to an embodiment of the present invention.

FIG. 4A is a simplified flowchart 400 depicting a method for generating a topological relationship between applications and systems according to an embodiment of the present invention. The method depicted in FIG. 4A may be performed by software (e.g., code, program, instructions) executed by a processor, in hardware, or combinations thereof. The software may be stored on a computer-readable storage medium. The method depicted in FIG. 4A is not intended to limit the scope of the application as recited in the claims. The processing depicted in FIG. 4A assumes that an alert or diagnostic request has been received. As described above, the alert or diagnostic request may comprise information identifying a symptom or symptom type, information identifying an application instance, information identifying a system, and the like.

As depicted in FIG. 4A, an application and a system are determined from the information in the alert or diagnostic request (step 402). In one embodiment, both the application and system may be identified in the alert or diagnostic request. In another embodiment, the alert or request may simply identify an application and the system determined in 402 corresponds to a system on which the identified application executes.

A set of applications that are related to the application identified in 402 are determined (step 404). In one embodiment, the data flow dependencies of the application identified in 402 are analyzed to determine other applications that are related to the application. As part of this analysis, applications that provide data (i.e., are upstream in the data flow to the application identified in 402), either directly or indirectly, to the application identified in 402 are determined. In some embodiments, one or more applications that receive data from the application identified in 402 may also be included in the set of related applications.

In one embodiment, information may be stored in data store 114 identifying dependencies and relationships between applications and systems. For a particular application, the stored information may identify other applications that are either directly or indirectly related to the particular application. The stored information may also identify the systems on which the applications execute. For example, a table such as Table 2 shown below may be stored in data store 114.

TABLE 2

| Application (System in which the application is executed) | Directly Related applications (Systems in which the related applications are executed) |
| --- | --- |
| Application A1 (System S1) | Application A3 (System 1) Application A4 (System S2) Application A6 (System 3) |
| Application A4 (System S2) | Application A6 (System S3) Application A3 (System S4) |

In one embodiment, a first application may be considered as directly related to a second application (e.g., A3 (on S1) is directly related to A1 (on S1) in Table 2), if the second application receives data from the first application (i.e., if data flows from the first application to the second application). For example, in Table 2, A3 (on S1) may be identified as directly related to A1 (on S1) because data flows from A3 (on S1) to A1 (on S1).

If application A1 (on S1) is identified in the alert or diagnostic request, then based upon Table 2, applications A3 (on S1), A4 (on S2), and A6 (on S3) are related to A1 (on S1). These applications are thus included in the set of related applications determined in 404. Further, since application A4 (on S2) is related to application A3 (on S4), application A3 (on S4) may also be considered to be indirectly related to application A1 (on S1) and may be included in the set of related applications determined in 404.

Accordingly, in embodiments where related information 114F is stored in data store 114, the information may be queried to identify a set of related applications for the application identified in the alert or diagnostic request. The identified applications that are related may include directly related applications and also indirectly related applications. The processing may comprise detecting directly related applications and then using the directly related applications to determine any indirectly related applications.

A set of related systems is then determined based upon the application and system determined in 402 and based upon the set of related applications determined in 404 (step 406). In one embodiment, the set of related systems may include systems on which the related applications identified in 404 execute. Information such as Table 2 stored in data store 114 may be used to determine the set of related systems. For the example provided above, this may include systems S1, S2, S3, and S4. In this case, the related information 114F may be used to determine the set of related systems. The set of related systems may also include other systems that are interconnected with the system determined in 402.

Topological hierarchical relationships are then determined between the application and system determined in 402 and the applications and systems determined in 404 and 406 (step 408). The hierarchical relationships typically model the flow of data between the applications and systems (see example depicted in FIG. 4B and described below). Based upon the processing performed in 406, a topological relationship is generated between the applications and systems encapsulating their hierarchical relationships.

Figure 4B:
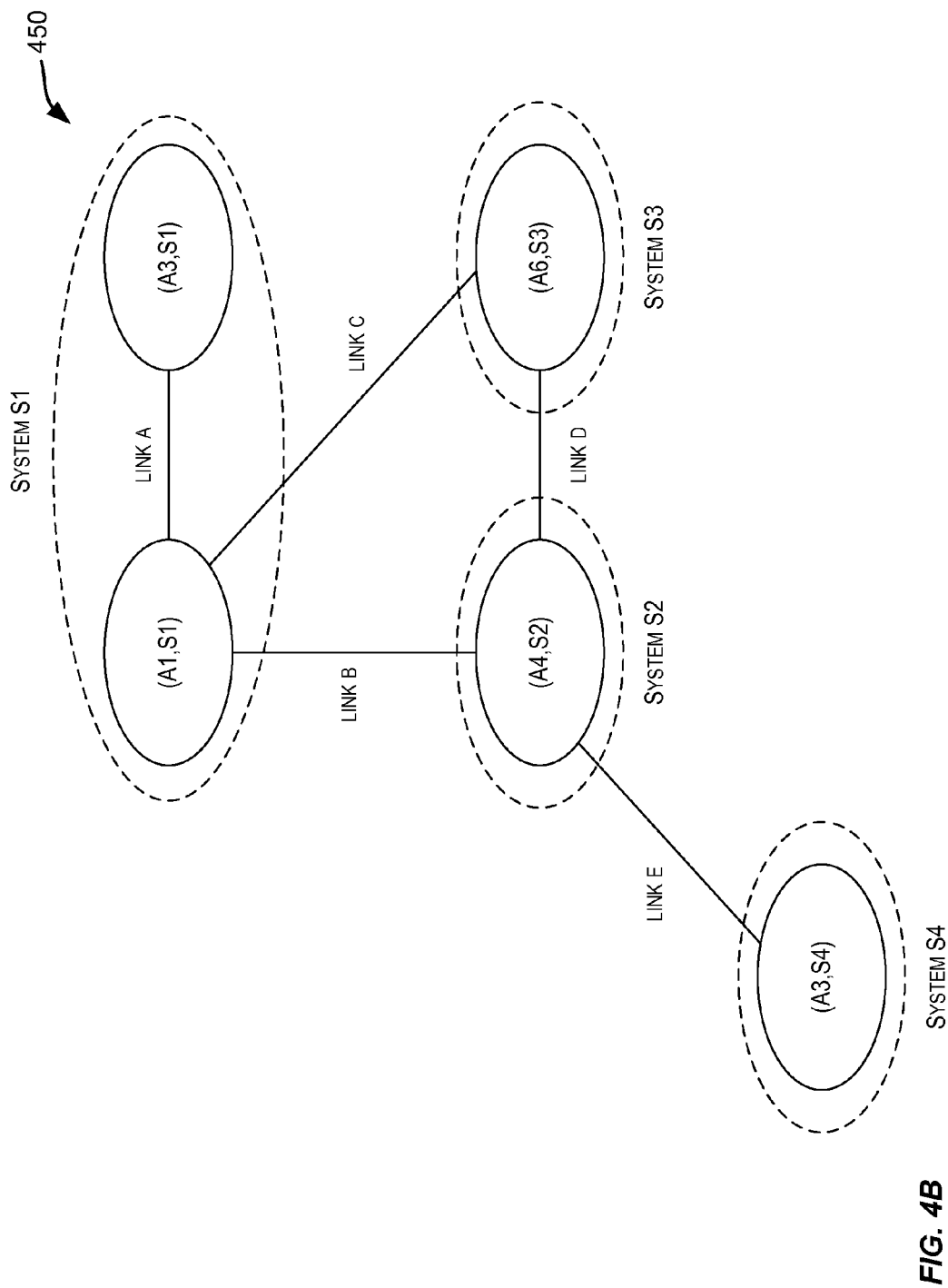
FIG. 4B depicts an example of a simple topological relationship that may be generated between applications and systems according to an embodiment of the present invention.

FIG. 4B depicts an example of a simple topological relationship 450 that may be generated between applications and systems according to an embodiment of the present invention. For purposes of simplifying the following description with reference to FIG. 4B, it is assumed that information stored in Table 2 is used to generate the topological relationship as depicted in FIG. 4B. However, this is not intended to limit the scope of the present invention.

As depicted in FIG. 4B, it is assumed that the application and the system determined in 402 are application A1 executed on system S1. For example, an alert may be received as follows:

"CPU utilization at 80% for database application A1 in computer system S1"

The above information states that a condition of CPU utilization at 80% has been detected for database application A1 executed in computer system S1. The application and system identified in the alert are denoted in FIG. 4B by node (A1, S1). From Table 2, it is determined that application A1 on system S1 is directly related to application A3 on system S1 (denoted as node (A3, S1) in FIG. 4B), application A4 on system S2 (denoted as node (A4, S2) in FIG. 4B), and application A6 on system S3 (denoted as node (A6, S3) in FIG. 4B). In order to denote these relationships in topological relationship 450, a link (link A) is drawn that connects nodes (A1, S1) and (A3, S1) indicating a relationship between these two nodes. Likewise, a link (link B) is drawn that connects nodes (A1, S1) and (A4, S2) indicating a relationship between nodes (A1, S1) and (A4, S2), and a link (link C) is drawn that connects nodes (A1, S1) and (A6, S3) indicating a relationship between nodes (A1, S1) and (A6, S3). Further, according to Table 2, application A4 on system S2 (denoted as node (A4, S2) in FIG. 4B) is related to application A6 on system S3 (denoted as node (A6, S3) in FIG. 4B) and Application A3 on system S4 (denoted as node (A3, S4) in FIG. 4B). Accordingly, node (A3,S4) is also considered as being related to node (A1,S1), although indirectly, and is included in topological relationship 450. Accordingly, a link (link D) is drawn that connects nodes (A4, S2) and (A6, S3) indicating a relationship between nodes (A4, S2) and (A6, S3), and a link (link E) is drawn that connects nodes (A4, S2) and (A3, S4) indicating a relationship between nodes (A4, S2) and (A3, S4). In this manner, a topological relationship 450 is generated for an alert or diagnostic request identifying A1 and S1 that comprises nodes (A1, S1), (A3, S1), (A4, S2), (A6, S3), (A3, S4) and links (A, B, C, D, E), as depicted in FIG. 4B.

As described above, the topological relationship generated in 410 not only represents the application or system that triggered the generation of the alert or request but also other systems and applications in the monitored system that are related to the application or system that triggered the generation of the alert or request. This is useful for the diagnosis, since the cause of the problem that triggered the alert or request may not exist in the application or system that triggered the generation of the alert or request but in some other interconnected application(s) or system(s). The relationships represented by a topological relationship enable identification of such other application(s) and/or system(s). The information encapsulated by the topological relationship thus enables identification of root causes in other systems or applications interconnected to the particular system or application that caused the generation of the alert or request. This enables embodiments of the present invention to diagnose problems across multiple interconnected applications and systems. This is very useful for performing diagnostics in an enterprise system that typically comprises several interconnected applications and systems.

Figure 5:
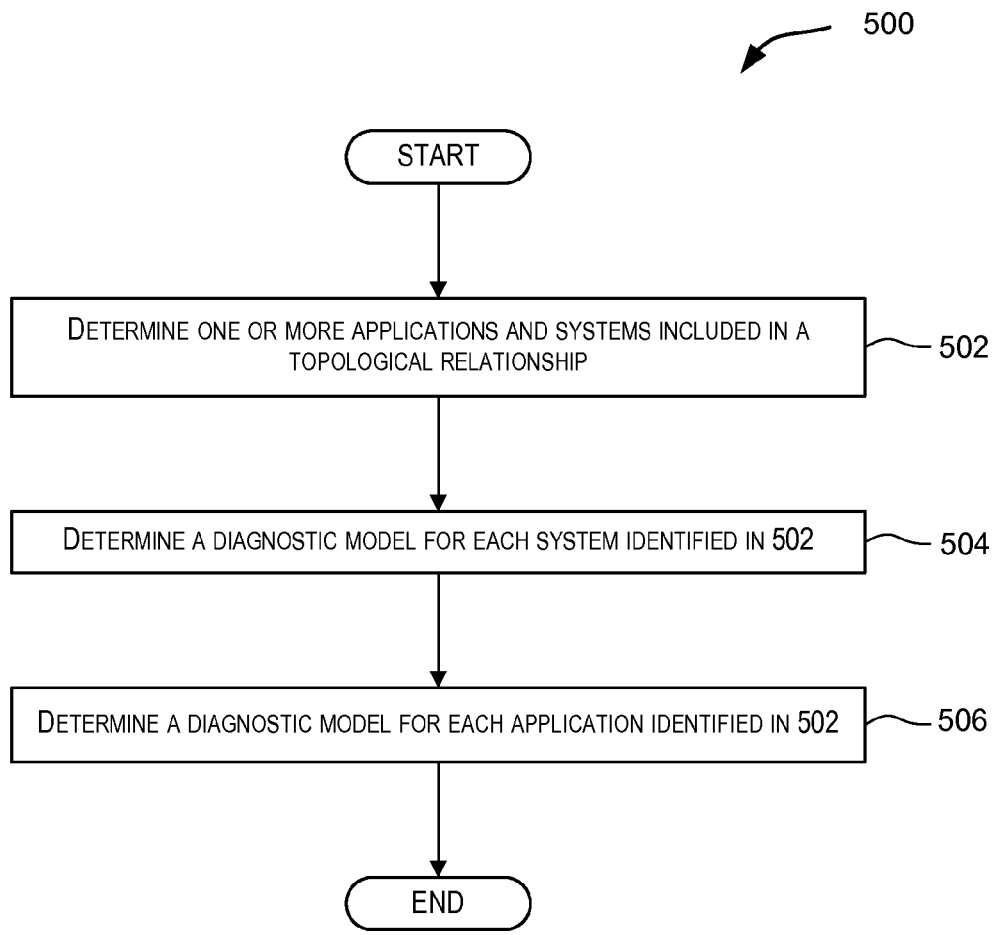
FIG. 5 is a simplified flowchart depicting a method for identifying a set of models for a topological relationship according to an embodiment of the present invention.

A topological relationship, such as the one depicted in FIG. 4B, is then used to identify a set of models for performing diagnostics for the received alert or diagnostic request. FIG. 5 is a simplified flowchart 500 depicting a method for identifying a set of models for a topological relationship according to an embodiment of the present invention. The method depicted in FIG. 5 may be performed by software (e.g., code, program, instructions) executed by a processor, in hardware, or combinations thereof. The software may be stored on a computer-readable storage medium. The method depicted in FIG. 5 is not intended to limit the scope of the application as recited in the claims.

A topological relationship is analyzed to determine one or more applications and systems included in the topological relationship (step 502). For example, topological relationship 450 depicted in FIG. 4B may be analyzed to identify applications and systems A1 on S1, A3 on S1, A4 on S2, A6 on S3, and A3 on S4.

A diagnostic model is then determined for each system identified in 502 (step 504). The diagnostic models determined for the systems are causal networks, each causal network modeled using a Bayesian network. In one embodiment, a mapping table may be used for mapping a system in the topological relationship to a corresponding diagnostic model. In one embodiment, this may be done based upon a specific symptom type that is associated with the system. For example, a table such as Table 3 shown below may be stored in data store 114. The table may be stored as part of mapping information 114A.

TABLE 3

| Symptom Type | System | Diagnostic Model |
| --- | --- | --- |
| CPU utilization at 80% | S1 | M5 |
| Memory usage at 90% | S2 | M6 |
| No Response | S2 | M7 |
| No Response | S3 | M8 |

Table 3 as shown above indicates that for symptom "CPU utilization at 80%" detected in system S1, the corresponding diagnostic model to be used is model M5. Likewise, for "No Response" detected in system S2, a corresponding diagnostic model to be used is model M7, and so on. Accordingly, information such as information stored in Table 3 may be used in 504 to determine a model for each system included in the topological relationship. The symptom type used for the mapping may be the symptom type identified in the received alert or diagnostic request.

Referring back to FIG. 5, a diagnostic model is determined for each application determined in 502 (step 506). The diagnostic models determined for the applications are causal networks, each causal network modeled using a Bayesian network. In one embodiment, a mapping table may be used for mapping an application in the topological relationship to a corresponding diagnostic model. In one embodiment, this may be done based upon a specific symptom type that is associated with the application. For example, a table such as Table 1 shown discussed above may be used for mapping an application to a corresponding diagnostic model for the application.

Table 1 indicates that for symptom "CPU utilization at 80%" and application A1, the corresponding diagnostic model to be used is model M1. Likewise, for "Memory usage at 90%" and application A2, a corresponding diagnostic model to be used is model M2, and so on. Accordingly, information such as information stored in Table 1 may be used in 506 to determine a model for each application included in the topological relationship. The symptom type used for the mapping may be the symptom type identified in the received alert or diagnostic request.

Figure 6A:
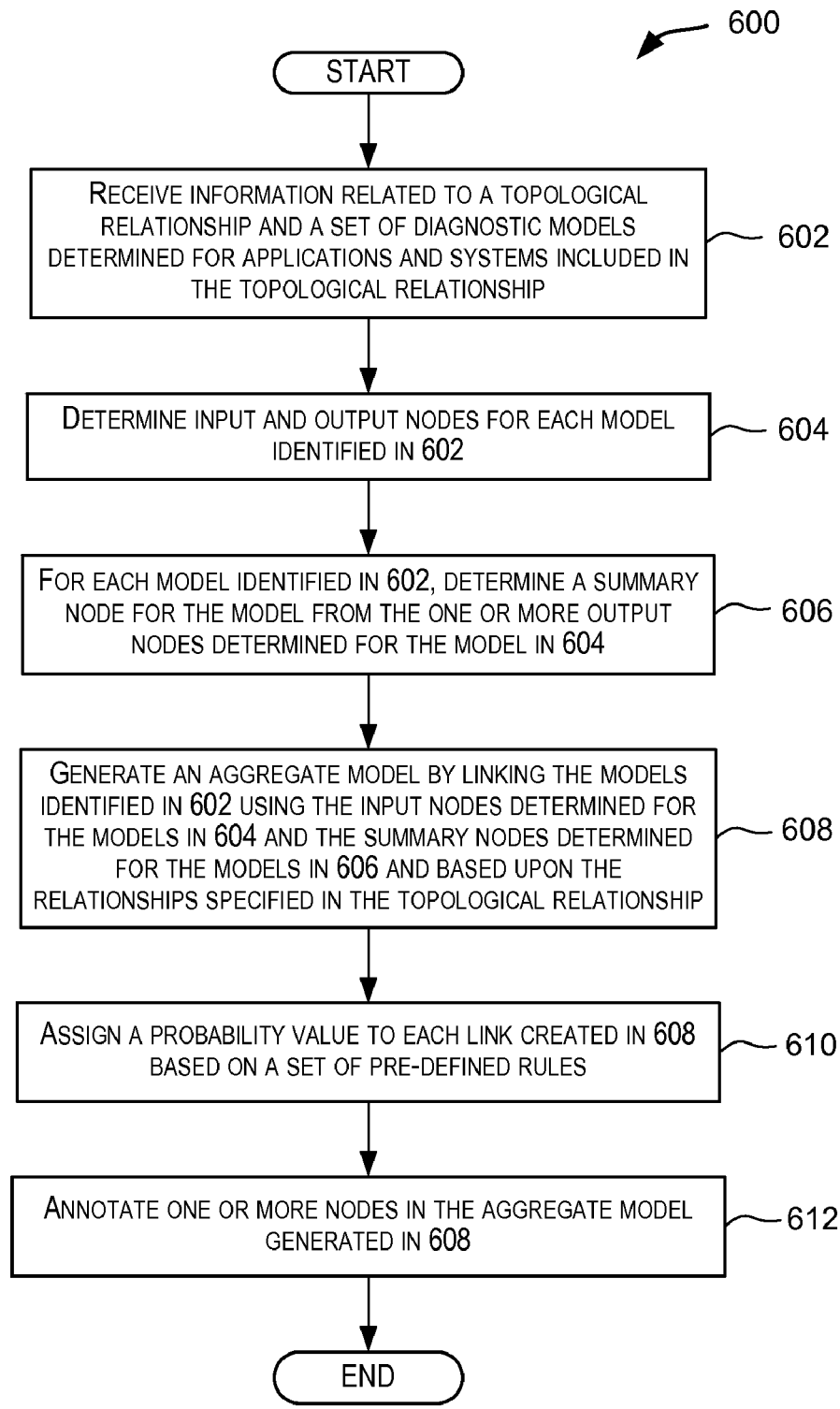
FIG. 6A is a simplified flowchart depicting a method for generating an aggregate model according to an embodiment of the present invention.

The models determined based upon the topological relationship are then used to assemble or generate an aggregate model. FIG. 6A is a simplified flowchart 600 depicting a method for generating an aggregate model according to an embodiment of the present invention. The method depicted in FIG. 6A may be performed by software (e.g., code, program, instructions) executed by a processor, in hardware, or combinations thereof. The software may be stored on a computer-readable storage medium. The method depicted in FIG. 6A is not intended to limit the scope of the application as recited in the claims.

As mentioned above, a set of models are identified for systems and applications identified in a topological relationship (e.g., the topological relationship generated in step 310 of FIG. 3). In one embodiment, the set of models identified for the systems and applications in a topological relationship may be causal networks modeled using Bayesian networks.

Information is received related to a topological relationship and diagnostic models determined for the applications and systems included in the topological relationship (step 602). One or more input nodes and one or more output nodes are determined for each model identified in 602 (step 604). In one embodiment, each model has only one input node but can have one or more output nodes. One or more nodes in a diagnostic model are tagged as input or output nodes by a designer of the model during design time. An input node of a model represents a node to which an output node of another model can connect to during assembly of an aggregated model. An output node of a model is a node that represents a summarization of the combination of the node's predecessor nodes in the model.

A summary node is determined for each model identified in 602 from the set of one or more output nodes determined for the model in 604 (step 606). In one embodiment, a summary node represents the combined effects of all the output nodes determined in 604. One of the output nodes of a model may be designated as the summary node for that model during design time when the model is configured.

An aggregate model is then generated by linking the models identified in 602 using the input nodes determined for the models in 604 and the summary nodes determined for the models in 606 and based upon the relationships specified in the topological relationship (step 608). An aggregate model may be generated based on a topological relationship determined between application and systems (e.g., the topological relationship generated in step 310 of FIG. 3). As part of building the aggregate model the relationships between the applications and the systems in the topological relationship are preserved by generating corresponding links or arcs between models corresponding to the applications and systems. Two models are connected by connecting the summary node or one model to an input node of the other model.

Figures 6B, 6C:
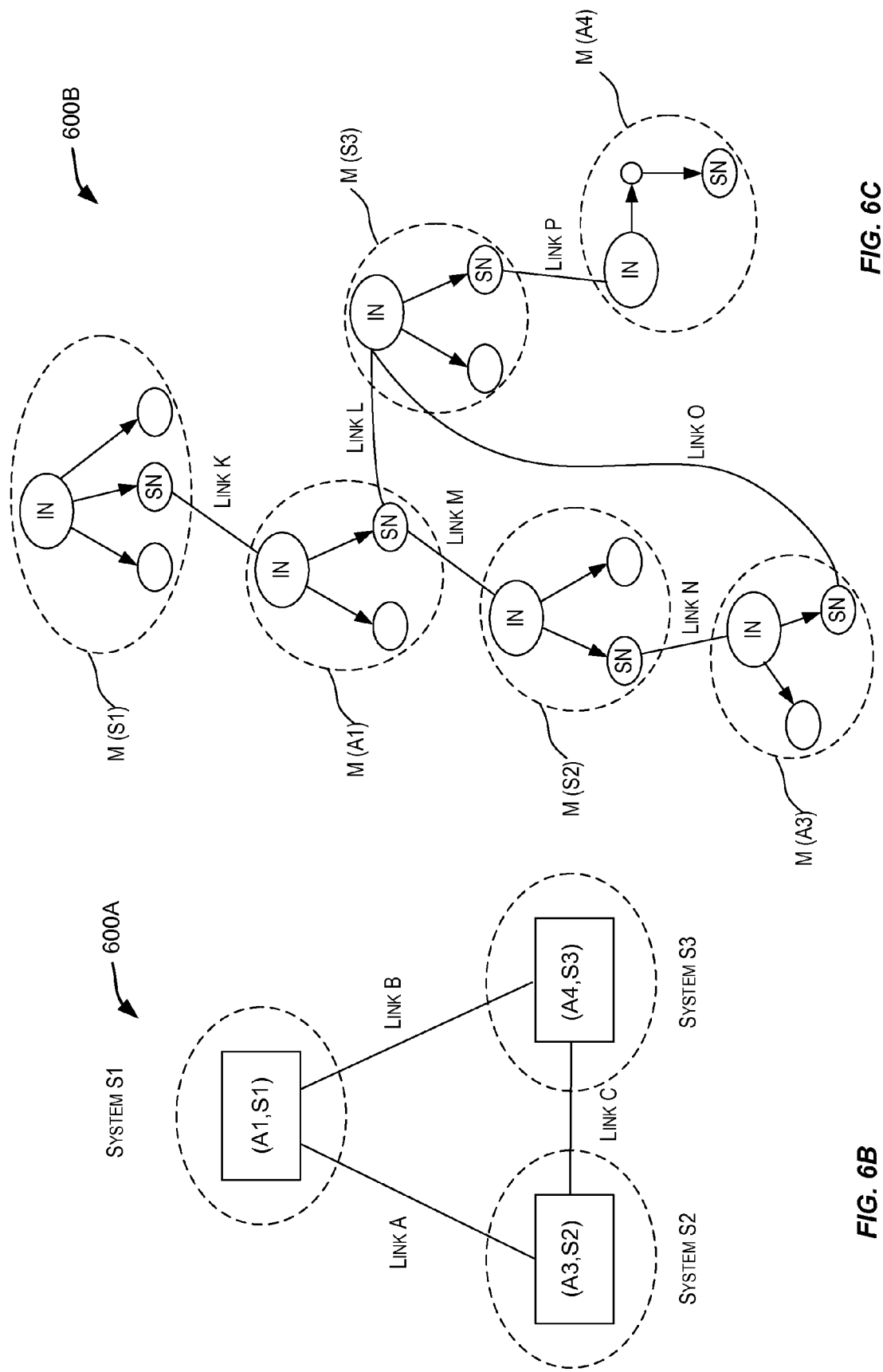
FIG. 6B depicts a simple topological relationship according to an embodiment of the present invention.
FIG. 6C represents an aggregate model generated for the topological relationship depicted in FIG. 6B according to an embodiment of the present invention.

FIGS. 6B and FIG. 6C provide an example of how an aggregate model is generated based upon a topological relationship according to an embodiment of the present invention. FIG. 6B depicts a simple topological relationship 600A and FIG. 6C represents an aggregate model 600B generated for topological relationship 600A. As depicted in FIG. 6B, topological relationship 600A specifies a topological relationship between applications and systems represented by nodes (A1, S1), (A3, S2), (A4, S3) and links A, B, C. For example, node (A1, S1) denotes application A1 on system SI, node (A3, S2) denotes application A3 on system S2, and node (A4, S3) denotes application A4 on system S3. The links A, B, C indicate relationships between these nodes.

As depicted in FIG. 6C, aggregate model 600B comprises a diagnostic model for each application and system included in topological relationship 600A. For example, aggregate model 600B comprises a model M(S1) for system S1, a model M(S2) for system S2, a model M(S3) for system S3, a model M(A1) for application A1, a model M(A3) for application A3, and a model M(A4) for application A4. Each model has at least one input node (denoted by IN) and a summary node (denoted by SN).

The models of the applications and systems are connected in such a way so as to preserve the relationships identified between the applications and the systems in topological relationship 600A. Each node in topological relationship 600A represents an application executing on a system. This relationship is represented in the aggregate model by connecting the model corresponding to the application to the model corresponding to the system. In the embodiment depicted in FIG. 6C, the summary node of the model corresponding to the system is connected by a link to the input node of the model corresponding to the application executing on the system. For example, for node (A1,S1) in topological relationship 600A, in aggregate model 600B the summary node of model M(S1) is connected by link K to the input node of M(A1). Likewise, for node (A3,S2) in topological relationship 600A, in aggregate model 600B the summary node of model M(S2) is connected by link N to the input node of M(A3). Similarly, for node (A4,S3) in topological relationship 600A, in aggregate model 600B the summary node of model M(S3) is connected by link P to the input node of M(A4).

In the above example, a relationship represented by a node is created in the aggregate model by creating a link between the summary node of a model for the system and the input node of a model for the application. In alternative embodiments, the relationship represented by the node may be created in the aggregate model by creating a link between the summary node of a model for the application and the input node of a model for the system. Further, in the above example, links between nodes in the topological relationship are represented in the aggregate model by creating a link between a summary node of a model for the application identified in one node and an input node of a model for the system identified in the second node. In alternative embodiments, links between nodes in the topological relationship are represented in the aggregate model by creating a link between a summary node of a model for the system identified in one node and an input node of a model for the application identified in the second node.

Links are also created between models in aggregate model 600B based upon the links between nodes in topological relationship 600A. In one embodiment, this is done by connecting the model corresponding to the application of one node to the model corresponding to the system of another node. In the embodiment depicted in FIG. 6C, the summary node of the model corresponding to the application of one node is connected by a link to the input node of the model corresponding to the system of another node. For example, for the relationship in topological relationship 600A between nodes (A1,S1) and (A3,S2) represented by link A, in aggregate model 600B, the summary node of M(A1) is connected by link M to an input node of M(S2). Likewise, for the relationship in topological relationship 600A between nodes (A1,S1) and (A4,S3) represented by link B, in aggregate model 600B, the summary node of M(A1) is connected by link L to an input node of M(S3). Similarly, for the relationship in topological relationship 600A between nodes (A3,S2) and (A4,S3) represented by link C, in aggregate model 600B, the summary node of M(A3) is connected by link 0 to an input node of M(S3). In alternate embodiments, the relationships between nodes may be represented in the aggregate model by connecting the summary node of the model corresponding to the system of one node by a link to the input node of the model corresponding to the application of another node.

In this manner, an aggregate model 600B is generated that comprises one or more models or sub-models (e.g., M(S1), M(A1), M(A3), M(S2), M(S3), and M(A4)) and one or more arcs or links (links K, L, M, N, O, P) that connect these sub-models. In one embodiment, each sub-model in an aggregate model may comprise one or more nodes that represent either faults or observations and one or more links that connect the one or more nodes. In one embodiment, faults are the underlying causes that the model tries to infer based on the state of linked observations.

Returning to FIG. 6A, after links have been created between the models, a probability value may be assigned to each link created in the aggregate model between the models (step 610). In one embodiment, the probability value that is assigned to a link in an aggregate model may be a value in the range between 0% and 100%. The value that is assigned to a link in an aggregate model may indicate a degree of influence between the models linked by the link. In one embodiment, the probability values are calculated using predefined rules. In one embodiment, the influence of the one or more input models may be equally weighted to distribute probability equally.

One or more nodes in the aggregate model generated in 608 may then be annotated (step 612). Annotations are performed to ensure that the nodes in the aggregate model can be uniquely identified. This enables diagnostic tests or probes associated with a node to be uniquely identified based upon the annotations created for that node. There are different ways in which a node may be annotated. For example, a node in the aggregate model may be annotated with information that identifies a particular user, an application type, a symptom type, and the like. The aggregate model generated according to the processing depicted in FIG. 6A is then available for further processing including performing diagnostics for the received alert or diagnostic request.

As described above, once an aggregate model is generated, the aggregate model is used to determine the evidence information for the monitored system to be collected in order to perform the diagnostics for the received alert or diagnostic request. The evidence information to be collected represents information about the monitored system that is to be gathered in order to perform the diagnosis. In one embodiment, the aggregate model is used to identify a set of probes or tests to be executed in order to gather the evidence information.

Figure 7:
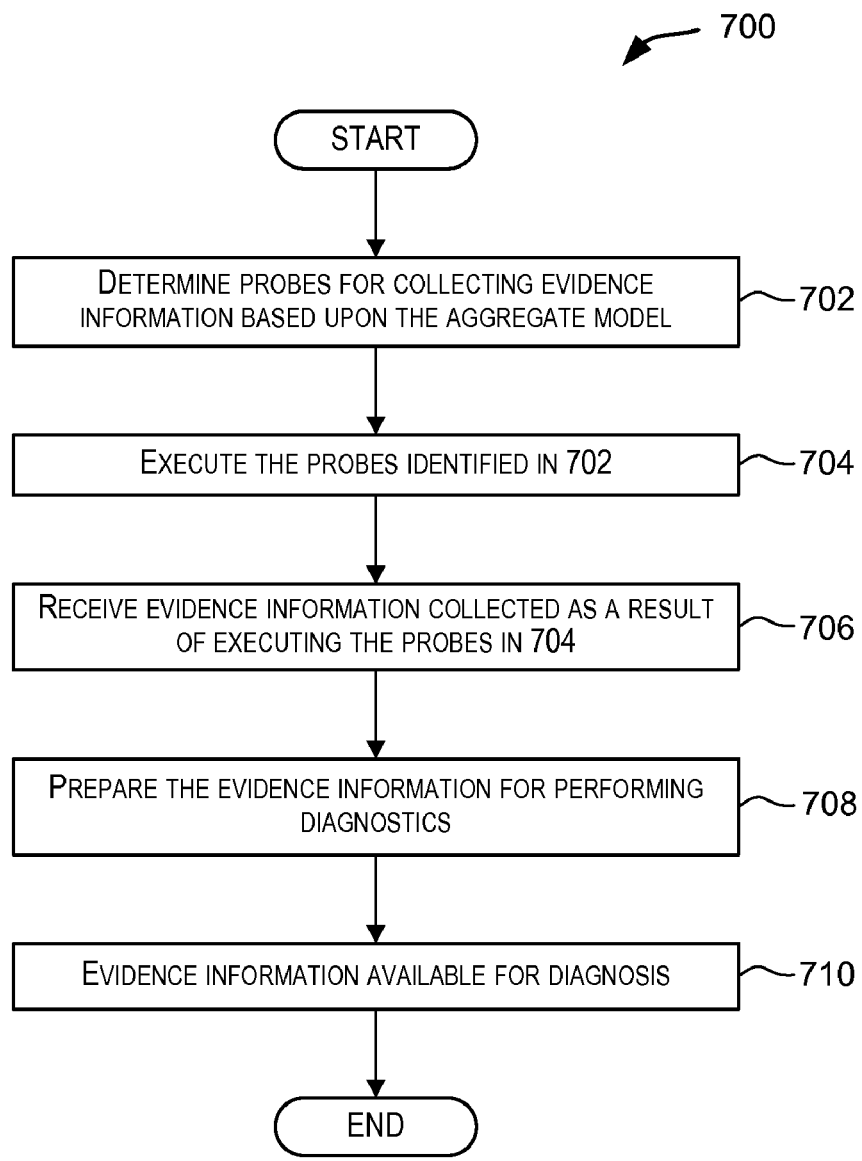
FIG. 7 is a simplified flowchart depicting a method for determining a set of probes and retrieving evidence information for performing diagnosis according to an embodiment of the present invention.

FIG. 7 is a simplified flowchart 700 depicting a method for determining a set of probes and retrieving evidence information for performing diagnosis according to an embodiment of the present invention. The method depicted in FIG. 7 may be performed by software (e.g., code, program, instructions) executed by a processor, in hardware, or combinations thereof. The software may be stored on a computer-readable storage medium. The method depicted in FIG. 7 is not intended to limit the scope of the application as recited in the claims.

As mentioned above, an aggregate model is generated using individual models for applications and systems. These individual models may be referred to as sub-models of the aggregate model. For example, aggregate model 600B depicted in FIG. 6C comprises six sub-models.

Based upon the aggregate model, one or more probes or tests are determined for collecting evidence information to be used for performing diagnosis for the received alert or diagnostic request (step 702). In one embodiment, as part of 702, a set of probes is determined for each sub-model in the aggregate model. It is possible that there may be no probes for a particular sub-model. In one embodiment, probes for a sub-model may be determined based upon the nodes in the sub-model. Since the probes are based upon the aggregate model that has been generated in response to the alert or diagnostic request, the probes are customized for gathering evidence information that is to be used for diagnosing the alert or diagnostic request. The probes are geared to gather evidence for symptoms identified in the alert or diagnostic request.

The probes identified in 702 are then executed (step 704). The probes may be executed either automatically or manually. In the manual case, information may be output to a user recommending/requesting the user to run the identified probes. In one embodiment, the set of probes identified in 702 may be grouped into requests by diagnostic system 212 depicted in FIG. 2 with each request comprising probes corresponding to a sub-model of the aggregate model. Diagnostic system 212 may then forward the requests to evidence collector 210. A request may include various types of information. In one embodiment, the request may include information identifying one or more diagnostic tests to be performed on monitored system 110. As part of 702, evidence collector 210 may then send the requests to monitored system 110 for execution of the requests.

The probes may be executed at monitored system 110. The probes may be directed to different systems or applications in monitored system 110. For example, a request corresponding to a sub-model for a system may be executed on that system. Likewise, a request corresponding to a sub-model for an application may be executed against that application. In this manner, the requests are customized for and directed to specific applications or systems and configured to gather evidence information for those applications and systems. The probes in a request generated for a sub-model are directed to gather information related to the system or application corresponding to the sub-model.

Evidence information collected as a result of executing the probes is then received (step 706). The evidence information that is collected may include configuration information of monitored system 110, results of executing scripts in monitored system 110, log files from monitored system 110, and the like. The evidence information includes observations about the status of monitored system 110. In one embodiment, the evidence information comprises a list of observed values related to monitored system 110.

In one embodiment, the evidence information is received by evidence collector 210 on a per request basis, where the evidence information for a request comprises information collected as a result of executing one or more probes included in the request. Evidence collector 210 may then forward the evidence information to diagnostic system 212.

The evidence information that is received is then prepared for application to the aggregate model (step 708). The processing in 708 may be performed by evidence collector 210 or by diagnostic system 212. Annotations may be added to the evidence information. For example, annotations may be added to the evidence information to enable portions of the evidence information to be properly attributed to certain requests or set of probes, which in turn can be attributed to particular sub-models in the aggregate models. Annotations allow a piece of evidence information to be attributed to a set of probes and their corresponding sub-models in the aggregate model. For example, a portion of the evidence information that is received in 706 may be annotated to indicate that evidence information is collected and received for application A1 in system S1, while another portion of the evidence information is annotated to indicate that a portion of evidence information is collected and received for application A2 in system S3.

In one embodiment, as part of 708, the received evidence information resulting from various requests is collated or merged. As indicated above, evidence information may be received on a per request basis. The requests may be executed at different times. The evidence information received for the various requests may be collated or merged together. In one embodiment, the merging may be performed on a periodic basis, e.g., every 15 minutes. Accordingly, all evidence information that is collected and received during each 15-minute period may be merged. The evidence information is then made available for application to the aggregate model for performing diagnostics for the received alert or diagnostic request (step 710).

As previously described with respect to step 320, diagnostics for the received alert or diagnostic request are performed by applying the gathered evidence information to the aggregate model. In one embodiment, a software engine such as GeNIe may be used for the analysis. In one embodiment, the processing involves inferring the most likely root causes for the symptoms and conditions identified by the alert or diagnostic request. The results may also include recommendations or actions to be performed for mitigating or resolving the symptoms or conditions. One or more of the actions may also be initiated automatically by diagnostic causal heuristic system 112. The results may be output in various different forms as desired by consumers of the information.

Figure 8:
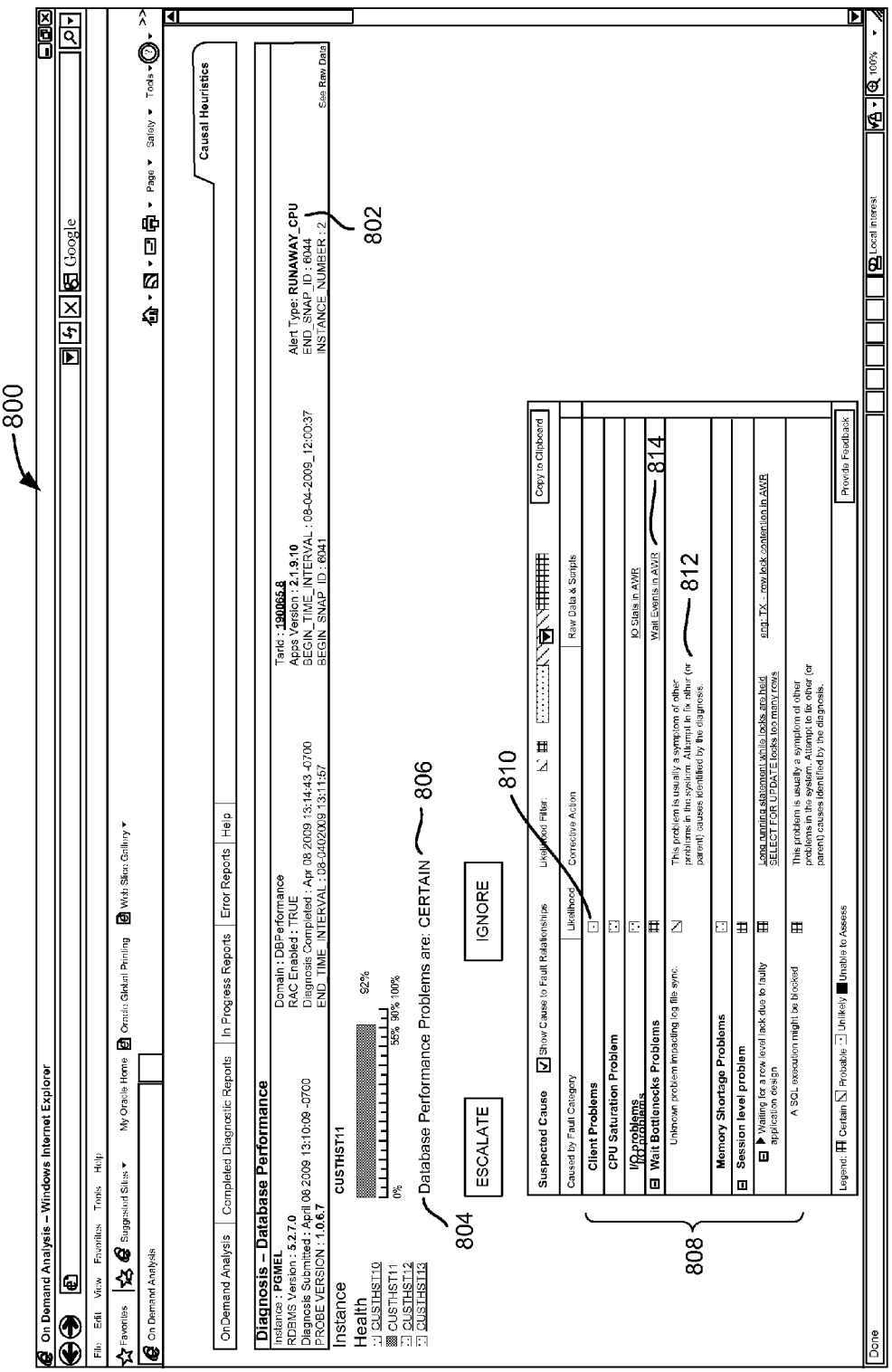
FIG. 8 depicts an example of how diagnostic results may be output according to an embodiment of the present invention.

FIG. 8 depicts an example of how diagnostic results may be output according to an embodiment of the present invention. GUI 800 depicted in FIG. 8 displays information related to diagnostics performed by causal heuristic system 112. As shown, information 802 identifying the alert that triggered the diagnostic analysis is displayed. The symptom 804 experienced by the monitored system is identified (e.g., database performance problems). A level of certainty 806 of the symptom is also indicated. Information 808 identifying possible root causes of the database performance problem is displayed. For each root cause, the likelihood or probability 810 that the root cause causes the problem is also identified. From the information output by GUI 800, a user can easily determine the likely cause of the observed condition. GUI 800 thus outputs information that enables a user to determine the likely root causes for an observed condition in an easy, automated, and timely manner.

GUI 800 also outputs one or more corrective actions suggestions 812 for alleviating the problem. Information 814 identifying scripts that are executed and raw data that is collected and used for the diagnostics analysis is also identified.

As described, probabilistic causal heuristics are used to perform diagnosis. The diagnostic processing identifies likely root causes of conditions or errors detected in a monitored system. By using causal heuristics for performing the analysis, embodiments of the present invention are able to perform root cause analysis even when the diagnostic data is not complete. Accordingly, embodiments of the present invention are able to provide likely root cause analysis results even with incomplete diagnostic data. This is not possible with traditional diagnostic systems that use deterministic rules based systems that require complete diagnostic data in order to perform the diagnosis.

By providing causal models for applications and systems, embodiments of the present invention simplify the complexity of a monitored system into manageable individual components. A causal model for a system or application codifies the tribal knowledge of problem diagnosability for the system or application. Further, by selecting one or more models to be used for the diagnostics based upon information in the alert or diagnostic request, only those models that are relevant for diagnosing a particular problem are automatically selected. The aggregate model built using these selected models thus represents a causal model that is customized for the alert or diagnostic request being diagnosed. In this manner, embodiments of the present invention enable situation-specific diagnostics.

Further, by building a topological relationship that encompasses applications and systems, software infrastructure and system level interactions are represented and considered during the diagnosis. This is superior to many traditional diagnostic systems that only perform diagnostics by analyzing intra-application level problems but do not take into consideration underlying system level interactions and issues. Embodiments of the present invention enable diagnostics that encompass business process applications failures and underlying infrastructure component failures.

In addition to identifying root causes, the likelihood or probability of each root cause contributing to the problem being diagnosed is also provided by embodiments of the present invention. The causal modeling of problem diagnosability and system knowledge enables the diagnosis to disambiguate, diagnose, and classify problems that are neither certain nor unlikely but suspect—a category of problems that identifies potential eminent problems, and which cannot be diagnosed by traditional rule-based diagnostic systems.

Figure 10:
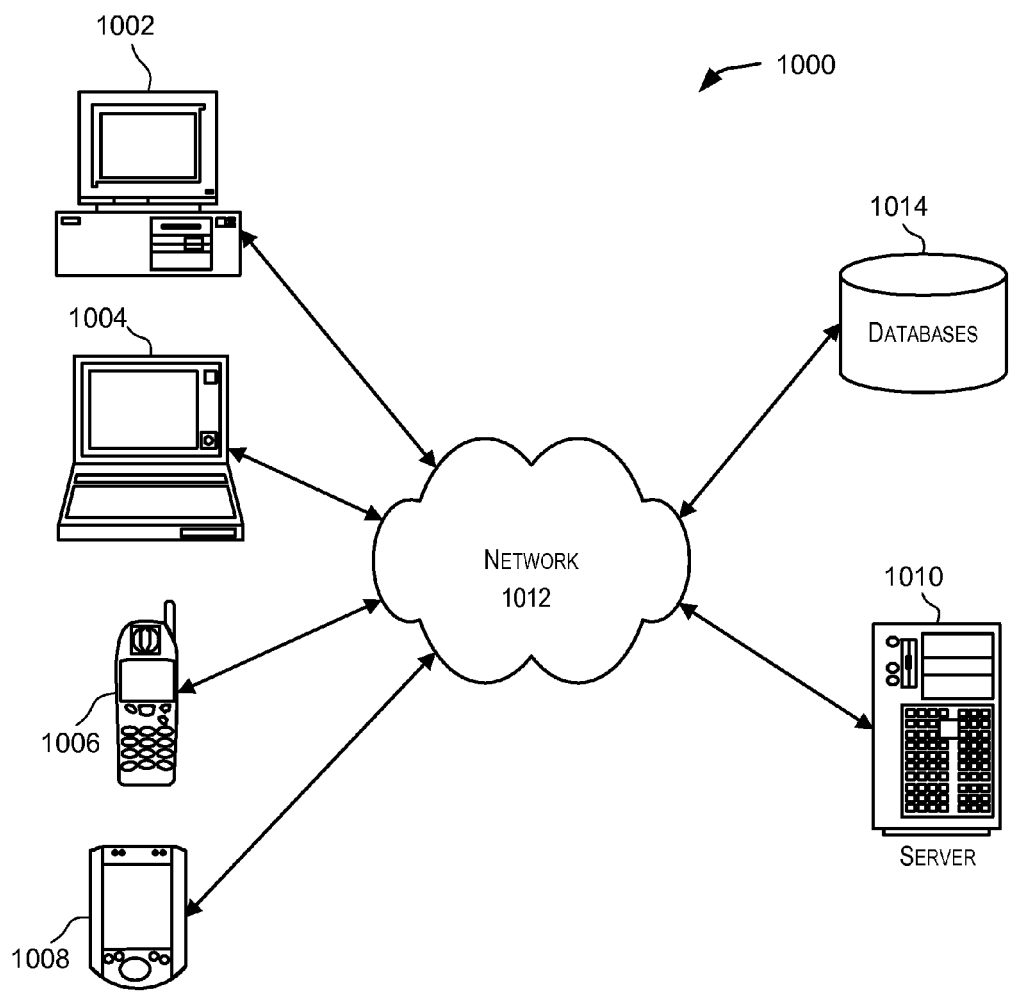
FIG. 10 is a simplified block diagram illustrating physical components of a system environment that may be used in accordance with an embodiment of the present invention.

FIG. 10 is a simplified block diagram illustrating physical components of a system environment 1000 that may be used in accordance with an embodiment of the present invention. This diagram is merely an example, which should not unduly limit the scope of the claims. One of ordinary skill in the art would recognize many variations, alternatives, and modifications.

As shown, system environment 1000 includes one or more client-computing devices 1002, 1004, 1006, 1008 communicatively coupled with a server computer 1010 via a network 1012. In one set of embodiments, client-computing devices 1002, 1004, 1006, 1008 may be configured to run one or more components of a graphical interface described above.

Client-computing devices 1002, 1004, 1006, 1008 may be general purpose personal computers (including, for example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, and/or other communication protocol enabled), and/or workstation computers running any of a variety of commercially-available UNIX or UNIX-like operating systems (including without limitation the variety of GNU/Linux operating systems). Alternatively, client-computing devices 1002, 1004, 1006, and 1008 may be any other electronic devices capable of communicating over a network (e.g., network 1012 described below) with server computer 1010. Although system environment 1000 is shown with four client-computing devices and one server computer, any number of client-computing devices and server computers may be supported.

Server computer 1010 may be a general-purpose computer, specialized server computer (including, e.g., a LINUX server, UNIX server, mid-range server, mainframe computer, rack-mounted server, etc.), server farm, server cluster, or any other appropriate arrangement and/or combination. Server computer 1010 may run an operating system including any of those discussed above, as well as any commercially available server operating system. Server computer 1010 may also run any of a variety of server applications and/or mid-tier applications, including web servers, Java virtual machines, application servers, database servers, and the like. In various embodiments, server computer 1010 is adapted to run one or more Web services or software applications that provide the diagnostics functionality described above. For example, server computer 1010 may be configured to execute the various methods described in the various flowcharts described above.

As shown, client-computing devices 1002, 1004, 1006, 1008 and server computer 1010 are communicatively coupled via network 1012. Network 1012 may be any type of network that can support data communications using any of a variety of commercially-available protocols, including without limitation TCP/IP, SNA, IPX, AppleTalk, and the like. Merely by way of example, network 1012 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infrared network; a wireless network (e.g., a network operating under any of the IEEE 802.11 suite of protocols, the Bluetooth protocol known in the art, and/or any other wireless protocol); and/or any combination of these and/or other networks. In various embodiments, the client-computing devices 1002, 1004, 1006, 1008 and server computer 1010 are able to access the database 1014 through the network 1012. In certain embodiments, the client-computing devices 1002, 1004, 1006, 1008 and server computer 1010 each has its own database.

System environment 1000 may also include one or more databases 1014. Database 1014 may correspond to an instance of integration repository as well as any other type of database or data storage component described in this disclosure. Database 1014 may reside in a variety of locations. By way of example, database 1014 may reside on a storage medium local to (and/or resident in) one or more of the computers 1002, 1004, 1006, 1008, 1010. Alternatively, database 1014 may be remote from any or all of the computers 1002, 1004, 1006, 1008, 1010 and/or in communication (e.g., via network 1012) with one or more of these. In one set of embodiments, database 1014 may reside in a storage-area network (SAN) familiar to those skilled in the art. Similarly, any necessary files for performing the functions attributed to the computers 1002, 1004, 1006, 1008, 1010 may be stored locally on the respective computer and/or remotely on database 1014, as appropriate. In one set of embodiments, database 1014 is a relational database, such as Oracle 10 g available from Oracle Corporation that is adapted to store, update, and retrieve data in response to SQL-formatted commands. In various embodiments, database 1014 stores data that is used for providing diagnostic capabilities as described above.

Figure 11:
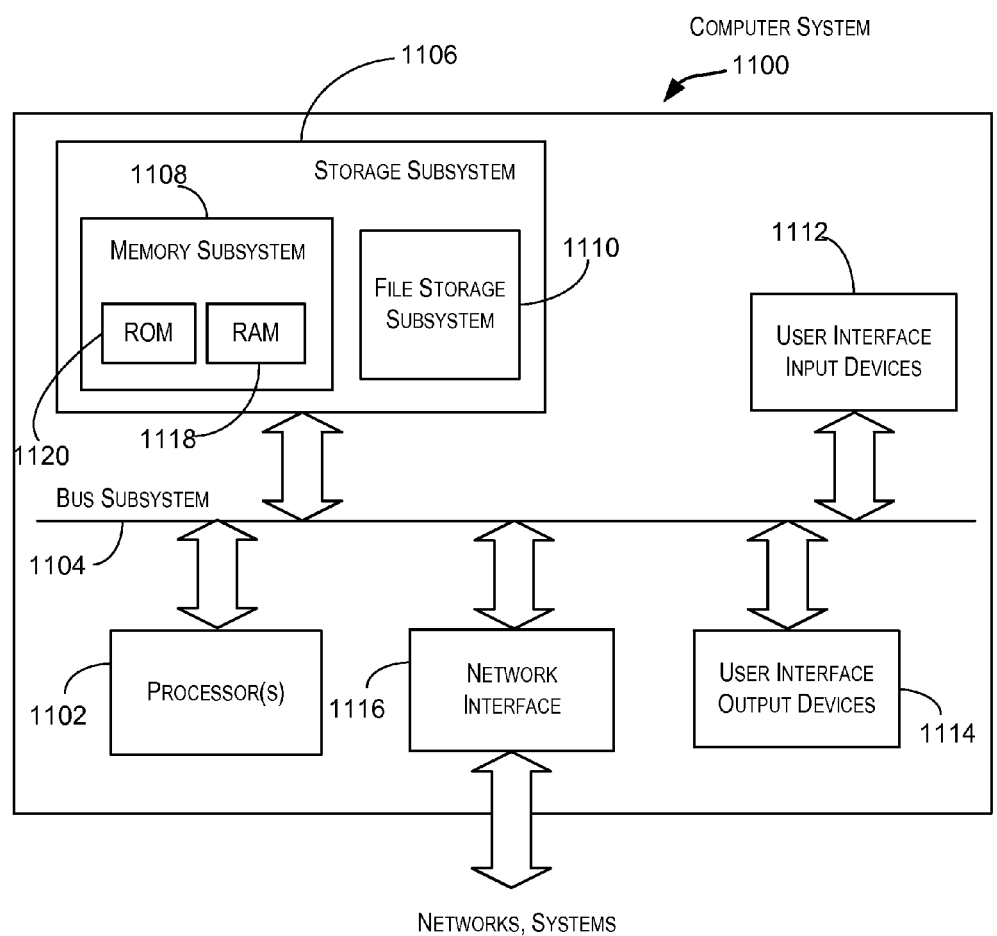
FIG. 11 is a simplified block diagram of a computer system that may be used to practice an embodiment of the present invention.

FIG. 11 is a simplified block diagram of a computer system that may be used to practice an embodiment of the present invention. Computer system 1100 may serve as a processing system 102 depicted in FIG. 1. In various embodiments, computer system 1100 may be used to implement any of the computers 1002, 1004, 1006, 1008, 1010 illustrated in system environment 1000 described above. In one embodiment, one or more computer systems 1100 may be used to implement processing system 102. As shown in FIG. 11, computer system 1100 includes a processor 1102 that communicates with a number of peripheral subsystems via a bus subsystem 1104. These peripheral subsystems may include a storage subsystem 1106, comprising a memory subsystem 1108 and a file storage subsystem 1110, user interface input devices 1112, user interface output devices 1114, and a network interface subsystem 1116.

Bus subsystem 1104 provides a mechanism for letting the various components and subsystems of computer system 1100 communicate with each other as intended. Although bus subsystem 1104 is shown schematically as a single bus, alternative embodiments of the bus subsystem may utilize multiple busses.

Network interface subsystem 1116 provides an interface to other computer systems, networks, and portals. Network interface subsystem 1116 serves as an interface for receiving data from and transmitting data to other systems from computer system 1100. For example, network interface subsystem 1116 may facilitate communication of data between processing system 102 and monitored system 110.

User interface input devices 1112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 1100.

User interface output devices 1114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1100.

Storage subsystem 1106 provides a computer-readable storage medium for storing the basic programming and data constructs that provide the functionality of the present invention. Software (programs, code modules, instructions) that when executed by a processor provide the functionality of the present invention may be stored in storage subsystem 1106. These software modules or instructions may be executed by processor(s) 1102. Storage subsystem 1106 may also provide a repository for storing data used in accordance with the present invention. For example, data store 114 may be stored in storage subsystem 1106. Information such as system information related to monitored system 110, conditions detected in monitored system 110, diagnostic requests received from users or alerts generated in response to conditions in monitored system 110, and other information used by processing system 102 for performing diagnostics as described above may be stored in storage subsystem 1106. Topological relationship information, evidence information gathered by processing system 102, results of diagnostics, diagnostic reports, and other like information may also be stored in storage subsystem 1106. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read only memory (ROM) 1120 in which fixed instructions are stored. File storage subsystem 1110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 1100 can be of various types including a personal computer, a portable computer, a workstation, a network computer, a mainframe, a kiosk, a server or any other data processing system. Due to the ever-changing nature of computers and networks, the description of computer system 1100 depicted in FIG. 11 is intended only as a specific example for purposes of illustrating the preferred embodiment of the computer system. Many other configurations having more or fewer components than the system depicted in FIG. 11 are possible.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A computer-readable storage medium storing a plurality of instruction for controlling a processor to perform diagnostics, the plurality of instructions comprising:

instructions that cause the processor to determine a set of tests based upon an aggregate model, the aggregate model comprising a plurality of models and links between the models, wherein each model in the aggregate model is a causal network;

instructions that cause the processor to receive evidence information obtained from executing the set of tests, the evidence information comprising information related to a monitored system; and instructions that cause the processor to apply the evidence information to the aggregate model to obtain diagnostics results.

2. The computer-readable storage medium of claim 1 wherein each model in the plurality of models identifies causal relationships between one or more faults and observations.

3. The computer-readable storage medium of claim 2 wherein each model in the plurality of models is a Bayesian network.

4. The computer-readable storage medium of claim 1 wherein:

the plurality of instructions further comprises instructions that cause the processor to generate a request for a first model in the plurality of models, the request comprising one or more tests determined based upon the first model; and the instructions that cause the processor to receive the evidence information comprise instructions that cause the processor to receive data obtained as a result of executing the request.

5. The computer-readable storage medium of claim 1 wherein the instructions that cause the processor to determine the set of tests based upon the aggregate model comprise instructions that cause the processor to determine one or more tests for a first model in the plurality of models, the first model corresponding to a system or an application, the one or more tests determined for the first model representing tests to be executed for obtaining information related to the system or application.

6. The computer-readable storage medium of claim 1 wherein the set of tests comprises one or more tests to be executed in the monitored system.

7. The computer-readable storage medium of claim 1 wherein the evidence information comprises observable information about the monitored system.

8. The computer-readable storage medium of claim 1 wherein the diagnostics results comprise information identifying one or more likely root causes for a symptom or condition detected in the monitored system.

9. A system for performing diagnostics, comprising:

a memory configured to store an aggregate model, the aggregate model comprising a plurality of models and links between the models, wherein each model in the aggregate model is a causal network; and a processor coupled to the memory, the processor configured to determine a set of tests based upon the aggregate model, receive evidence information obtained from executing the set of tests, the evidence information comprising information related to a monitored system, and apply the evidence information to the aggregate model to obtain diagnostics results.

10. The system of claim 9 wherein each model in the plurality of models identifies causal relationships between one or more faults and observations.

11. The system of claim 10 wherein each model in the plurality of models is a Bayesian network.

12. The system of claim 9 wherein the processor is configured to:

generate a request for a first model in the plurality of models, the request comprising one or more tests determined based upon the first model; and receive data obtained as a result of executing the request.

13. The system of claim 9 wherein the processor is configured to determine one or more tests for a first model in the plurality of models, the first model corresponding to a system or an application, the one or more tests determined for the first model representing tests to be executed for obtaining information related to the system or application.

14. The system of claim 9 wherein the set of tests comprises one or more tests to be executed in the monitored system.

15. The system of claim 9 wherein the evidence information comprises observable information about the monitored system.

16. The system of claim 9 wherein the diagnostics results comprise information identifying one or more likely root causes for a symptom or condition detected in the monitored system.

17. A method of performing diagnostics, the method comprising:

determining, by a processor system, a set of tests based upon an aggregate model, the aggregate model comprising a plurality of models and links between the models, wherein each model in the aggregate model is a causal network;

receiving, by the processor system, evidence information obtained from executing the set of tests, the evidence information comprising information related to a monitored system; and apply, by the processor system, the evidence information to the aggregate model to obtain diagnostics results.

18. The method of claim 17:

further comprising generating, by the processor system, a request for a first model in the plurality of models, the request comprising one or more tests determined based upon the first model; and wherein receiving the evidence information comprises receiving data obtained as a result of executing the request.

19. The method of claim 17 wherein:

the set of tests comprises one or more tests to be executed in the monitored system; and determining the set of tests based upon the aggregate model comprises determining one or more tests for a first model in the plurality of models, the first model corresponding to a system or an application, the one or more tests determined for the first model representing tests to be executed for obtaining information related to the system or application.

20. The method of claim 17 wherein the diagnostics results comprise information identifying one or more likely root causes for a symptom or condition detected in the monitored system.

* * * * *

UNITED STATES PATENT AND TRADEMARK OFFICE
CERTIFICATE OF CORRECTION

| | | |
|---|---|---|
| PATENT NO. | : 8,140,898 B2 | Page 1 of 1 |
| APPLICATION NO. | : 12/485766 | |
| DATED | : March 20, 2012 | |
| INVENTOR(S) | : Beg et al. | |

It is certified that error appears in the above-identified patent and that said Letters Patent is hereby corrected as shown below:

In column 8, line 13, delete "Al" and insert -- A1 --, therefor.

In column 8, line 14, delete "SI" and insert -- S1 --, therefor.

In column 11, line 5, delete "3 10." and insert -- 310. --, therefor.

In column 18, line 24, delete "SI," and insert -- S1, --, therefor.

Signed and Sealed this
Twelfth Day of June, 2012

David J. Kappos
*Director of the United States Patent and Trademark Office*